United States Patent [19]

Chern et al.

[11] Patent Number: 4,968,117

[45] Date of Patent: Nov. 6, 1990

[54] GRADED INDEX ASPERHIC COMBINERS AND DISPLAY SYSTEM UTILIZING SAME

[75] Inventors: Mao-Jin Chern, Rancho Palos Verdes; John J. Ferrer, Los Angeles; Ronald T. Smith, Redondo Beach, all of Calif.

[73] Assignee: Hughes Aircraft Company, Los Angeles, Calif.

[21] Appl. No.: 210,207

[22] Filed: Jun. 20, 1988

Related U.S. Application Data

[63] Continuation of Ser. No. 765,883, Aug. 14, 1985, abandoned, which is a continuation-in-part of Ser. No. 528,833, Sep. 2, 1983, Pat. No. 4,545,646, and Ser. No. 600,636, Apr. 16, 1984, abandoned.

[51] Int. Cl.$^5$ .......................... G02B 5/18; G02B 1/10; G02B 27/10; G02B 27/42
[52] U.S. Cl. ................................ 350/162.24; 350/164; 350/174
[58] Field of Search ................... 350/162.24, 164, 166, 350/174

[56] References Cited

U.S. PATENT DOCUMENTS

| | | | |
|---|---|---|---|
| 2,927,245 | 3/1960 | Irland et al. | 350/164 U X |
| 3,271,179 | 9/1966 | Smith | 350/166 |
| 3,940,204 | 2/1976 | Withrington | 350/3.72 |
| 4,181,751 | 1/1980 | Hall et al. | 427/53.1 |
| 4,309,075 | 1/1982 | Apfel et al. | 350/164 |
| 4,340,617 | 7/1982 | Deutsch et al. | 204/157.41 X |
| 4,371,587 | 2/1983 | Peters | 428/450 X |
| 4,447,469 | 5/1984 | Peters | 427/54.1 |
| 4,497,539 | 2/1985 | Sakurai et al. | 350/164 |
| 4,545,646 | 10/1985 | Chern et al. | 350/162.2 |

FOREIGN PATENT DOCUMENTS

| | | |
|---|---|---|
| 0007039 | 1/1980 | European Pat. Off. |
| 0066402 | 12/1982 | European Pat. Off. |
| 906370 | 1/1946 | France ................ 350/164 |
| WO8501115 | 3/1984 | PCT Int'l Appl. |
| WO8504961 | 11/1985 | PCT Int'l Appl. |
| 2006463 | 5/1979 | United Kingdom. |
| 2134282 | 8/1984 | United Kingdom. |

Primary Examiner—Bruce Y. Arnold
Assistant Examiner—Terry S. Callaghan
Attorney, Agent, or Firm—Leonard A. Alkov; Wanda K. Denson-Low

[57] ABSTRACT

An improved optical combiner useful in many applications is disclosed. The combiner includes a substrate with at least one aspheric surface and an diffraction-type reflective coating formed on the substrate for selectively reflecting radiation within one or more predetermined narrow band ranges of wavelengths impinging on the coating. The asperisity of the surface may be selected to compensate or balance optical aberations. The coating is advantageously a graded-index coating, which eliminates the possible degradation of gelatin halogram coatings due to moisture. A process for applying the graded-index coating to a substrate is disclosed. The variation in the index profile of the coating can be selected to provide the capability of combiners with multiple color reflectivity responses, or which allow use of display light sources of wider spectral bandwidth, resulting in a brighter image and improved angular bandwidth. In another disclosed embodiment, the combiner is incorporated in a biocular helmet visor display resulting in improved optical performance and a simpler, lightweight structure. In another embodiment, the combiner is incorporated into a head-up display for an aircraft resulting in improved performance, lower weight, improved safety and greater look-up capability.

32 Claims, 9 Drawing Sheets

Fig. 3.
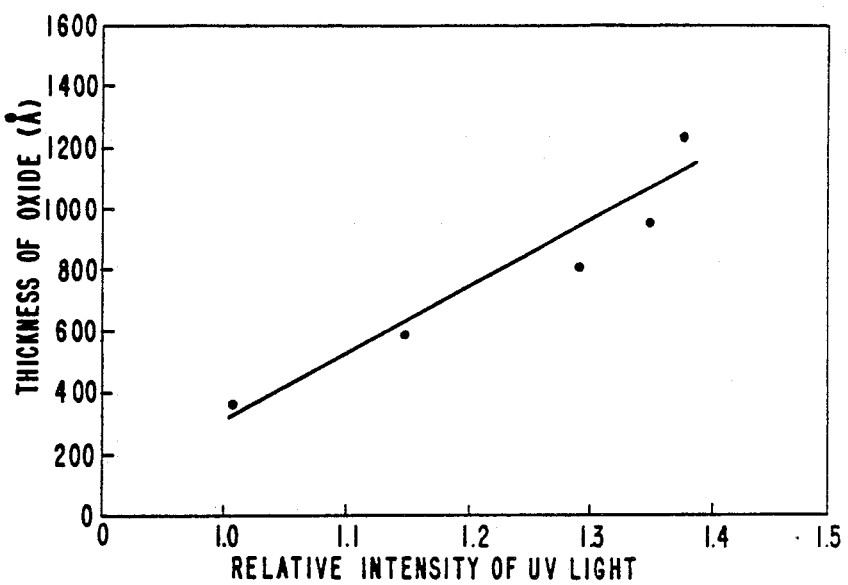
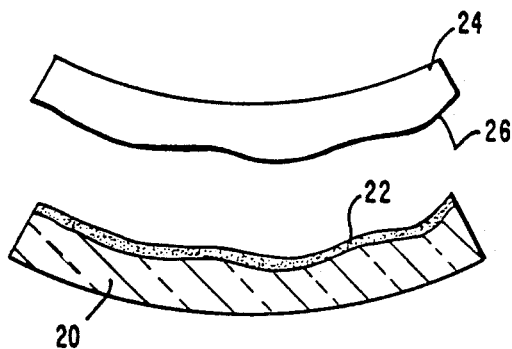
Fig. 4a.
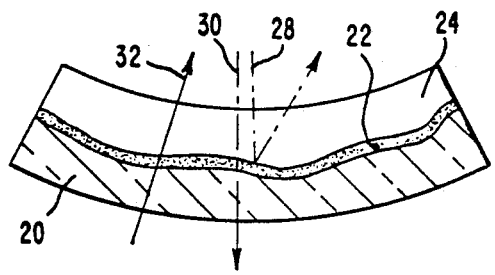
Fig. 4b.

GRADED INDEX ASPERHIC COMBINERS AND DISPLAY SYSTEM UTILIZING SAME

This application is a continuation of application Ser. No. 06/765,883, filed Aug. 14, 1985, now abandoned, which application is a continuation-in-part of application Ser. No. 528,833, filed Sept. 2, 1983, entitled "Process for Forming a Graded Index Optical Material, and Structures Formed Thereby" and now U.S. Pat. No. 4,545,646 issued Oct. 8, 1985 to M. J. Chern, R. T. Smith and J. W. Peters, application Ser. No. 600,636, filed Apr. 16, 1984, entitled "Biocular Holographic Helmet Mounted Display," now abandoned, each application assigned to the same assignee as this application.

BACKGROUND OF THE INVENTION

This invention relates generally to reflective optical materials, and more particularly to reflective diffraction and interference-type optical elements, such as optical filters and combiners, which are used, for example, in head-up displays or helmet-mounted visor displays.

In various optical systems, it is often necessary to provide a filter in order to remove undesired radiation while at the same time allowing desired radiation to be efficiently transmitted or reflected. Such filters and coatings are used, for example, to provide protection from laser radiation for personnel, for electro-optical detectors, and for optical mirrors in a laser system, as a holographic lens in a head-up display system, or in night vision devices The optical filters currently used for such purposes include absorption filters, reflective multiple layer dielectric filters, and diffraction filters generated by optical holographic techniques. However, each of these approaches to providing optical filters has certain disadvantages, as discussed below.

The absorption filter comprises a material which is impregnated with absorption dyes or materials with intrinsic absorption at the wavelength of the incoming laser radiation, as described, for example, in the book entitled "Handbook of Optics", W. G. Driscoll, ed., McGraw-Hill Book Co., New York, 1978, in Section 8 (Coatings and Filters), at pages 7 to 32. This type of protection has the serious disadvantage that the absorbing dye decreases the amount of transmitted radiation to unacceptably low levels. In addition, for laser applications, as the laser radiation energy increases, the radiation can damage the protective filter itself.

The reflective multiple layer dielectric filters typically consist of alternate layers of two dielectric materials of different refractive indices, which are formed on the surface of a substrate by known deposition techniques, such as chemical vapor deposition, sputtering, or thermal evaporation. When the optical thickness of each layer is chosen to be one-quarter of the wavelength of the radiation being reflected, such a structure is referred to as a "quarterwave stack", as discussed, for example, in U.S. Pat. No. 4,309,075 and in the book entitled "Handbook of Optics", previously referenced, in particular in Section 8. However, there are limitations on the spectral bandwidths which can be achieved by such structures, because of the limited material combinations available and the resulting restriction on the choices of index modulations. Moreover, defects at the abrupt interfaces between the layers in a multilayer structure can cause unwanted optical scattering. In addition, these defects can cause excessive absorption of radiation by the dielectric material, which can result in thermal damage to the optical filter. Furthermore, in a multilayer dielectric coating, the electric field is strongest at the interface regions between the high index material and the low index material. This highly localized field occurring at the abrupt interfaces can produce maximum temperature increases. Since the thermal expansion coefficients are different for the different dielectric materials of adjacent layers, high thermal stress is developed at the interface regions, which could cause delamination of the successive layers in the film. In addition, the high thermal stress could create microscopic dislocations which result in unwanted optical scattering by the film. Further, substrate roughness, pinholes and contaminants in the conventional multilayer structures formed by evaporation or sputtering techniques increase absorption and scattering, generate localized heating, reduce maximum reflectivity, and increase radiation damage. Finally, these multilayer coatings exhibit reflectance peaks at multiple wavelengths, which causes reduced optical transmission.

Diffraction optical elements have been generated using known methods of optical holography in photosensitive gelatin material, as discussed, for example, in the book entitled "Optical Holography" by Collier, Burckhardt, and Lin, Academic Press, New York, 1971, Chapter 9 (Diffraction from Volume Holograms) and Chapter 10 (Hologram Recording Materials), as well as in the book entitled "Handbook of Optical Holography", by Caulfield, Academic Press, New York, 1979, Chapter 10 (Application Areas). However, gelatin diffraction elements have environmental stability problems and are susceptible to degradation by humidity and heat. In order to overcome this problem, a protective layer such as glass or a glass-like coating can be used, but such a layer complicates the manufacturing process and adds to unit cost. Moreover, such gelatin filters are limited to use for radiation in the wavelength range from the visible to the near infrared (i.e., up to about 2 microns) since sensitized gelatin is not sensitive to longer wavelength exposures. Consequently, filters for infrared applications cannot be fabricated in a gelatin structure. In addition, the index modulation in the gelatin, which is produced by exposure to the holographic interference pattern and subsequent development, is limited to a shape approximating a sinusoidal configuration or a roughly superimposed multiple sinusoidal configuration. Furthermore, the fabrication of a gelatin filter requires numerous steps, in particular numerous wet chemical steps for development, which are sensitive to processing variables, such as temperature or vibration, that affect the efficiency and peak wavelength of the final structure. In addition, since the resistance of gelatin to damage by heat or radiation is relatively low, gelatin filters are limited to low power applications. Finally, fabrication of a filter which reflects radiation at two selected wavelengths requires multiple exposure of the gelatin to two holographic patterns, which produces an irregular index profile that reduces the efficiency of the filter.

One general application in which gelatin filters have heretofore been employed is that of the optical combiner element of a reflective display, such as a head-up display (HUD) or helmet visor display (HVD) commonly used in aircraft display systems. U.S. Pat. No. 3,940,204 discloses exemplary HUD and HVD systems. The laminated gelatin holographic combiner employed for these applications typically comprises a spherical plastic substrate to which are bonded successive layers of glass, the gelatin hologram, glass, plastic and an antireflective (AR) coating. The glass layers sandwiching the gelatin are required to protect the gelatin from degradation by humidity. As a result of the multiple layers, strong undesirable ghost images may be produced by the gelatin holographic combiners.

Combiners for display systems can be designed to compensate or balance aberrations in the display system. The compensation may comprise the implementation of aspheric reflective layers or surfaces. With the state of the current technology it is not economically feasible, on a production basis, to provide glass layers or substrates with aspheric surfaces. Instead the required asphericity is incorporated into the gelatin hologram itself, which means that the fringes will be slanted varying degrees with respect to the gelatin surfaces. This creates a grating at the hologram surface and results in a phenomenon known as chromatic dispersion, wherein the direction of light diffracted from the hologram is wavelength dependent. In a holographic display such as the HUD or HVD, if the display light source has any appreciable spectral bandwidth, chromatic dispersion will blur the image at the exit pupil, perhaps to an unacceptable level. Even with narrow band light sources, such as a cathode ray tube (CRT) with P43 phosphor, the fringe slant in some areas of the hologram may be large enough to cause significant dispersion-induced degradation of the image. Slant fringes may also result in flare, a condition in which extraneous diffraction images are produced. The extraneous diffraction may obscure the field of view.

A gelatin holographic combiner for a HUD or visor display is relatively complex and expensive to fabricate. For example, a typical gelatin holographic visor having impact resistance consists of a multi-layer laminant in which the gelatin hologram is sandwiched between two pieces of glass for humidity protection and then laminated between two pieces of polycarbonate visor for impact requirements. Antireflective coatings are applied to the respective outer surfaces of the polycarbonate pieces. The multiple laminate adds weight and complexity to the system. The gelatin holographic HUD combiner is similarly complex and heavy.

The weight of the combiner is an important consideration in the weight-critical cockpit environment. As a result of the relatively high weight of the visor gelatin hologram combiner in an HVD, the visor display center of mass is moved away from the pivot point of the pilot's head, so that the burden on his neck is increased. The increased cantilevered mass in the HUD gelatin hologram combiner decreases the combiner stiffness and resistance to vibration.

SUMMARY OF THE INVENTION

The present invention provides an improved optical combiner which is useful in many applications, including HVD and HUD applications. The combiner comprises a substrate having at least one aspheric surface and a diffraction-type reflective coating formed on this surface for selectively reflecting radiation within one or more predetermined narrow band ranges of wavelengths impinging on the coating. The asphericity of the surface may be selected to compensate or balance optical aberrations in the display system. The coating may comprise a gelatin hologram, but preferably is a graded-index coating which eliminates the potential degradation of gelatin holograms by a humid environment and eliminates the significant difficulties encountered in attempting to apply an even gelatin coating to an aspheric surface. The variation in the index of refraction may occur throughout the thickness of the coating and across the horizontal and lateral extent of the coating as well. A non-sinusoidal variation in the index profile throughout the thickness of the coating can produce a broadened peak in the spectral reflectivity function, as well as multiple peaks. This feature provides the capability of combiners with multiple color reflectivity responses, or which allow use of display light sources of wider spectral bandwidth, resulting in a brighter image and improved angular bandwidth.

In one embodiment the combiner is incorporated in a biocular helmet visor display resulting in improved optical performance, significant weight savings and a simpler, lower cost combiner structure. In another embodiment the combiner is incorporated into a head-up display for an aircraft resulting in improved optical performance, lower weight, improved safety and greater look-up capability.

Accordingly, it is a further purpose of the present invention to provide a new and improved optical combiner which substantially eliminates the chromatic dispersion and flare characteristics of slanted-fringe hologram combiners.

Another purpose is to provide an optical combiner comprising a substrate having an aspheric surface contour to compensate or balance optical aberrations.

Another purpose is to provide an improved optical combiner in which the diffraction coating is formed directly on a substrate and does not require glass protective layers.

Yet another purpose is to provide an optical combiner which minimizes strong second images.

Additional purposes of the invention are to provide an optical combiner having a relatively simple, lightweight structure which is suitable for fabrication by relatively low-cost techniques and with improved optical tolerances.

Further purposes are to provide improved helmet visor displays and head-up displays employing the improved optical combiner.

The foregoing and other advantages and features of the present invention will become more readily apparent from the following more particular description of the preferred embodiments of the invention, as illustrated in the accompanying drawings.

BRIEF DESCRIPTION OF THE DRAWINGS

FIG. 3 presents a graph showing the dependence of the thickness of the deposited oxide on the relative intensity of the ultraviolet light used to initiate the photochemical vapor deposition reaction of one embodiment of the present invention:

FIG. 4a and FIG. 4b are schematic diagrams of a structure having an aspheric substrate surface and a diffraction optical element formed on the surface thereof in accordance with the present invention.

FIG. 5 shows a curve indicating the measured spectral reflectance of a filter formed in accordance with the present invention, while

FIG. 7 presents the refractive index profile for a composite index filter formed in accordance with the present invention which reflects three separate wavelengths of radiation, while

FIG. 21 is a schematic representation, not drawn to scale, of a graded-index coating applied on a substrate and which varies laterally in stoichiometric composition and refractive index, coating thickness and peak wavelength.

DETAILED DESCRIPTION OF THE INVENTION

Figure 1:
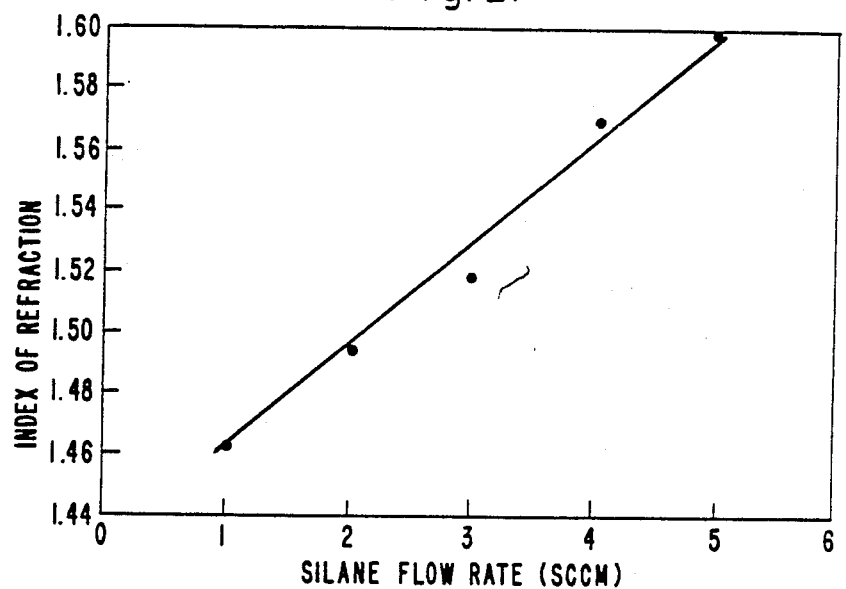
FIG. 1 presents a graph showing the change in the refractive index of a $SiO_x$ film which was deposited by a photochemical vapor deposition process, as a function of the flow rate of the silane reactant.

In order to form the continously graded index optical material of the present invention, it is required that the process for forming such a material be capable of a high degree of control over the composition of the deposited material. For the deposition of a continuously graded index oxide material, a particularly useful process is the low temperature, charge-free photochemical vapor deposition process described in U.S. Pat. No. 4,371,587, assigned to the present assignee, and the details of which are incorporated herein by reference. In one embodiment of the latter invention, neutral, charge-free atomic oxygen is generated by the mercury-sensitized photodissociation of a chosen oxygen-containing precursor, such as nitrous oxide, as shown in Equations (1) and (2) below. Then, the atomic oxygen is reacted with a selected vapor phase reactant, such as silane, to form the desired oxide, silicon monoxide (SiO) or silicon dioxide ($SiO_2$), as shown in Equation (3) below.

$$Hg + h\nu(2537\text{Å}) \rightarrow Hg^* \text{ (photoexcited)} \quad (1)$$

where h = Planck's constant
$\nu$ = frequency of absorbed radiation

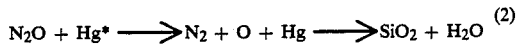

$$N_2O + Hg^* \longrightarrow N_2 + O + Hg \longrightarrow SiO_2 + H_2O \quad (2)$$

$$SiH_4 + O \longrightarrow SiO + H_2O \quad (3)$$

In an alternative process embodiment disclosed in U.S. Pat. No. 4,371,587, the required atomic oxygen may be generated by the direct photodissociation of a chosen oxygen-containing precursor, such as nitrous oxide ($N_2O$), as shown in Equation (4) below. The atomic oxygen so formed reacts with the chosen vapor phase reactant as shown in Equation (3) above.

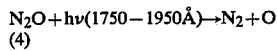

$$N_2O + h\nu(1750-1950\text{Å}) \rightarrow N_2 + O \quad (4)$$

The composition of the oxide product of Equation (3) above depends, in part, on the steady state concentration of atomic oxygen, which, in turn, depends on the amount of nitrous oxide present for a given amount of silane. Thus, by varying the ratio of the silane and nitrous oxide reactants present at a given point in time, the composition of the silicon oxide ($SiO_x$) product can be controlled, to produce a corresponding control of the refractive index of the oxide material deposited. The composition of the $SiO_x$ can range from SiO with a refractive index of 1.9 to $SiO_2$ with a refractive index 1.45.

The composition of the oxide, as well as the rate of deposition, depends on the mass flow of each of the reactants, the pump throughput, and the intensity of the reaction-inducing radiation. For a constant value for pump throughput and radiation intensity, the effect of changes in the flow rate of one of the reactant gases can be determined. FIG. 1 presents a graph showing the change in the refractive index of a $SiO_x$ film which was deposited as described above, as a function of the flow rate of the silane reactant for a constant flow rate of $N_2O$ at 62.0 standard cubic centimeters per minute (sccm). As can be seen in FIG. 1, the refractive index and composition of the $SiO_x$ film have a well-defined dependence on the gas flow rate ratio of the reactants. As shown in FIG. 1, the index of the $SiO_x$ film was varied from 1.46 to 1.60 by varying the $SiH_4$ flow rate by as much as a factor of five, while keeping a fixed $N_2O$ flow rate. The large variation in flow rate required to achieve a change in refractive index ($\Delta n$) of 0.14 indicates that the index can be changed precisely and reproducibly by the above-described process.

Figure 2:
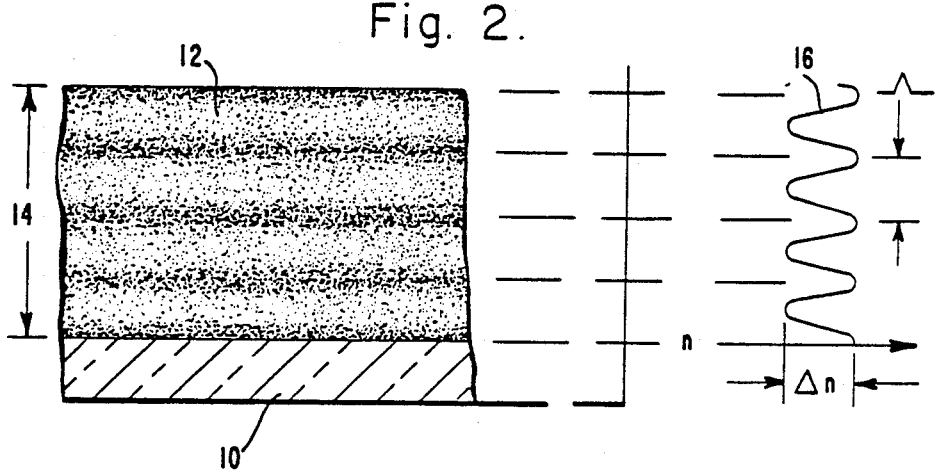
FIG. 2 is a schematic representation of the continuously graded index material in a sinusoidal pattern, formed in accordance with the present invention.

Consequently, in accordance with the process of the present invention, by accurately controlling the gas flow rate ratio of the silane reactant to the nitrous oxide reactant as a function of time, the composition of the $SiO_x$ product can be controllably and continuously altered as a function of time of deposition or thickness of the deposited material. In particular, the gas flow rate of the silane can be varied in a sinusoidal pattern to produce a corresponding sinusoidal variation in the composition of the SiO$_x$ deposited as a function of distance above the surface of the substrate, as shown in FIG. 2. The substrate 10, shown in FIG. 2 has a layer 12 of a continuously graded optical material, such as SiO$_x$, formed on the surface thereof by the above-described process. The composition of the SiO$_x$ material at a particular point along the depth or thickness 14 of the film 12 depends on the particular ratio of the reactant gases and the gas flow rate of silane at the time that particular material was deposited. Since the gas flow rate of the silane is varied in a sinusoidal pattern, the composition of the SiO$_x$ material in the layer 14 will vary in approximately the same sinusoidal pattern, taking into account small deviations from linearity. Further, since the refractive index of the SiO$_x$ material varies as the composition thereof, it follows that the refractive index (n) of the SiO$_x$ material likewise varies in a sinusoidal pattern 16 as a function of the thickness 14 of the layer 12, as shown in FIG. 2. Thus, there is a gradual change in the refractive index of the deposited layer 12 between upper and lower limits of n and in a predetermined pattern. The difference between the highest and lowest values of the refractive index of the SiO$_x$ material is $\Delta n$, the index modulation. The notation A in FIG. 2 refers to fringe periodicity, the significance of which is discussed below with regard to wavelength of reflected light and Equation (5).

Furthermore, the gas flow rate of the silane may be varied in some other pattern besides a sinusoidal pattern, such as a quasi-sinusoidal, triangular, sawtooth, squarewave, or predetermined irregular pattern, to produce corresponding variations in the composition and refractive index of the deposited material.

In addition to the effect of the reactant gas flow rate ratio discussed above, it should also be noted that the intensity of the reaction-inducing ultraviolet radiation affects the rate of deposition of the oxide. FIG. 3 presents a graph showing the dependence of the thickness of the deposited oxide in a twenty-minute period on the relative intensity of the ultraviolet (UV) light used to initiate the photochemical reaction. As shown in FIG. 3, as the intensity of the UV light is increased, the thickness of the oxide deposited in a given time period or the deposition rate increases. The source of the UV light used to generate the data of FIG. 3 in accordance with the first process embodiment of the present invention was a bank of four mercury vapor arc lamps with a major output at a wavelength of 254 nanometers, at a distance of 2.75 inches (6.99 centimeters) from the substrate. Alternatively, a scanning laser beam may be used as the source of reaction-inducing radiation in accordance with the second process embodiment of the present invention, as discussed in further detail herein. In addition to the reaction parameters discussed above with regard to FIGS. 1 and 3, control of the gas-flow pattern and the gas pressure inside the deposition chamber is also necessary for producing reproducible and uniform oxide layers.

In accordance with the above-described process of the present invention, the modulated index layer is formed parallel to the substrate surface, to provide a zero-degree (non-slanted fringe) diffraction optical element. However, the modulated index layer of the present invention may alternatively be formed on an aspheric substrate which incorporates optical power, to provide a diffraction optical element which compensates or balances optical aberration while providing undistorted see-through. Such a structure is shown schematically in FIGS. 4a and 4b. In FIG. 4a, there is shown a substrate 20 having an arbitrarily-shaped aspheric surface and formed, for example, of polycarbonate. On the surface of the substrate 20 and conforming thereto, there is formed in accordance with the process of the present invention a layer 22 comprising a continuously graded index optical material in a predetermined index pattern. As a separate element, there is shown in FIG. 4a a cover member 24, in which the surface 26 that faces the substrate 20 matches the surface profile of the substrate 20. The cover member 24 is laminated by means of epoxy or other optically transparent adhesive (not shown) to the substrate 20 having the layer 22 formed thereon, to provide the structure shown in FIG. 4b. As represented schematically in FIG. 4b, incident radiation 28 of a wavelength in the selected reflective band is reflected by the graded index layer 22; while radiation 30 with a wavelength outside the selected reflective band passes through the complete structure. When used in a head-up display system such as described in U.S. Pat. No. 3,940,204, assigned to the present assignee, incident radiation 28 is the light from a cathode ray tube which is diffracted by the graded index layer 22 to the eye of the viewer, and the radiation 32 is light from the environment outside the cockpit which is transmitted through the complete structure of FIG. 4b to the eye of the viewer. The ability to use such aspheric substrates greatly increases the number of diffraction optics applications which may be satisfied by the zero-degree diffraction optical element of the present invention. A structure such as shown in FIG. 4b is useful for head-up display diffraction optics combiners, for example, as previously discussed.

Further, it is anticipated that a slant fringe diffraction optical element may be formed in accordance with the present invention by positioning the nozzle slits of one reactant gas near the substrates. The other reactant gas flows uniformly across the entire substrate surface; and the slits are separated at a distance equal to the fringe spacing on the substrate surface. The slant angle is controlled by the related movement of the substrate and the nozzle slits, as the deposition proceeds.

The significance of the above-described process for forming a continuously graded index optical material in a predetermined pattern is that such a process may be advantageously used to form a reflective diffraction optical element which performs similarly to a conventional holographic filter, to diffract the incident light and produce a preselected diffraction effect, as described, for example, in the book entitled "Optical Holography", previously referenced, in Chapter 1 (Introduction to Basic Concepts).

The optical properties of a film consisting of discrete, multiple layers are well-described by multi-layer matrix theory, as discussed, for example, by P. H. Berning in the book entitled "Physics of Thin Films", edited by G. Hass, Academic Press, New York, 1963, starting at page 69. This theory may be applied to the calculations of the optical properties of a graded-index film by approximating the graded film as a stack of "N" very thin discrete-index layers. For "N" of a very large value, this approximation is sufficiently accurate for the devices of the present invention. Using this approximation and conventional multilayer film optical theory, the reflectance, transmittance, and absorbance for both s- and p-polarizations, as well as their averages can be calculated, preferably with the aid of a computer program, for graded-index films. These calculations can be made at any wavelength or angle of incidence for any graded-index coating configuration. The electric field and absorption profile within the coating can also be calculated. Such calculations indicate the feasibility of fabricating narrow band, high reflectance spectral filters by deposition of graded index films. This method of analyzing graded-index films is described, for example, by K. A. Winick, in the Final Scientific Report on "Thick Phase Holograms", Environmental Research Institute of Michigan, January, 1981.

Calculations of the optical properties of graded index films illustrate that the reflectance characteristic of the film depends primarily on the Fourier composition of the index profile. Thus, for example, a holographically exposed diffraction optical element with sinusoidal index modulation has the same performance at the designed reflection wavelength ($\lambda p$) as that of the multilayer square modulation of equal periodicity whose fundamental Fourier component is of equal modulation amplitude. Consequently, for some diffraction optics applications where high reflectance at only a single wavelength is desired, the squarewave multilayer film and the sinusoidally modulated film are equally viable alternatives, in terms of optical properties. However, because of the disadvantages of the multilayer structure previously discussed, the sinusoidal profile or some other graded index profile which the process of the present invention provides, may offer distinct advantages over the multilayer squarewave profile.

Furthermore, the graded index film of the present invention may be designed to have any peak wavelength or wavelengths desired, barring materials limitations, by designing each sinusoidal component of the index profile to have a periodicity A described in Equation (5) below.

$$\Lambda_i = \lambda_{pi}/2n \qquad (5)$$

where $\Lambda_i$ = periodicity of the $i^{th}$ sinusoidal component in the index profile $\lambda_{pi}$ = $i^{th}$ peak wavelength n = average index of refraction $SiO_x$ graded index filters are material-limited to a peak wavelength from 0.4 to 2.5 micrometers, since $SiO_x$ becomes highly absorptive outside this range. However, other materials besides $SiO_x$, such as aluminum oxide or zirconium oxide, may be used to form a layer with a graded index profile which reflects radiation at higher or lower wavelengths. Thus, by the process of the present invention, diffraction optical elements may be formed to reflect radiation in the ultraviolet, visible and infrared ranges.

In addition, in accordance with an alternative to the first process embodiment of the present invention, the peak reflection wavelength ($\lambda_p$) may be varied across the horizontal surface of the diffraction optical element by varying the localized reactant gas flow rate across the substrate surface as desired or by varying the intensity of the reaction-inducing radiation, as discussed herein, to produce variations in the thickness, refractive index, periodicity, and $\lambda_p$ of the deposited material. Such devices with horizontal variations of $\lambda_p$ have been heretofore unattainable.

Moreover, the process of the present invention may be used to form layers which exhibit modulation in either absorptivity or refractive index or both, since there is a known relationship between absorptivity and refractive index. Absorptivity $\alpha$ is defined in Equation (6) below, and the relationship thereof to refractive index is defined in Equation (7) below.

$$\alpha = \frac{4\pi k}{\lambda} \qquad (6)$$

where $\alpha$ = absorptivity k = extinction coefficient $\lambda$ = wavelength of incident radiation $$N = n - ik \qquad (7)$$

where

N = complex refractive index n = real refractive index k = extinction coefficient Thus, in the same way that variations in n, the real refractive index, of a layer of material may be produced as previously described herein, so may corresponding variations in the extinction coefficient, k, of a layer of material be produced. For example, photochemically deposited oxides, such as $SiO_2$, have a cutoff region (e.g. about 2.5 micrometers for $SiO_x$) at which they become highly absorptive, and the absorptivity is highly dependent on the stoichiometric composition. Thus, by varying the stoichiometric composition of $SiO_x$ in accordance with the present invention, a structure may be produced which exhibits modulation of absorptivity as well as refractive index. Consequently, the detailed discussion herein with respect to "refractive index" is intended to include the "complex refractive index" described above.

Figure 5:
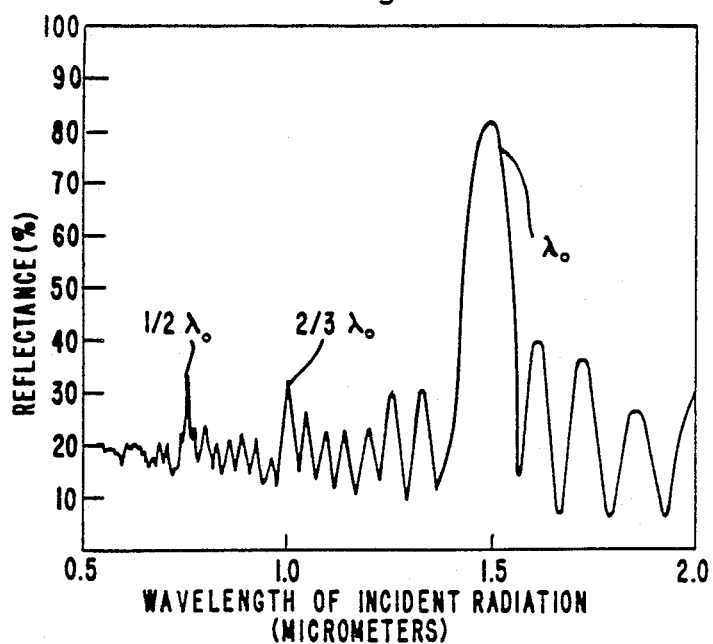

Using the above-described photochemical vapor deposition process as further described in Example 1, an oxide filter was formed with a 16-period, sinusoidally modulated refractive index that varied between 1.45 and 1.63, producing a peak wavelength at 1.48 micrometers ($\mu m$). The spectral reflectance of the filter was measured for various wavelengths of incident radiation using a spectrophotometer and known precedures, and the curve obtained is shown in FIG. 5. A reflectance of 81.3 percent at the fundamental wavelength ($\lambda_o$) of 1.48 micrometers was obtained, as shown in FIG. 5. This reflectance value is to be compared to the theoretical prediction of 94.1 percent reflectance at 1.48 $\mu m$ shown in FIG. 6, which was based on the theory and calculations previously discussed.

Figure 6:
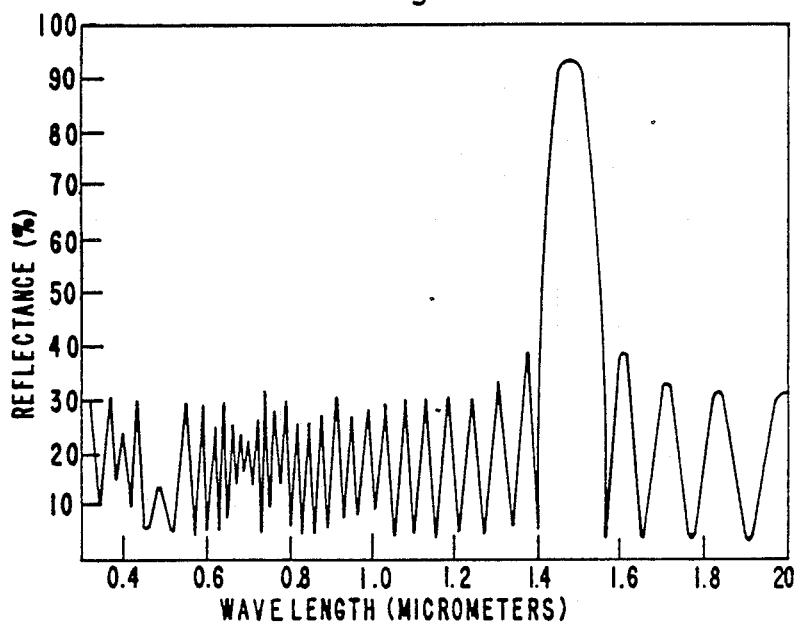
FIG. 6 presents the theoretical reflectance for such a structure.

The fact that the measured reflectance peak of 81.3 percent in FIG. 5 deviated somewhat from the predicted 94.1 percent in FIG. 6 indicates that the modulated-index pattern of the deposited film deviated somewhat from the intended sinusoidal pattern. This conclusion is supported by the observation of small reflectance peaks in FIG. 5 at higher-order harmonics: $\frac{1}{2}\lambda_o$ (0.75 $\mu m$) and $\frac{2}{3}\lambda_o$ (1.0 $\mu m$). Each reflectance spike corresponds to a particular Fourier component of the refractive index profile. Therefore, a perfect sinusoidally modulated index profile will exhibit only one reflectance peak, at the fundamental wavelength of $\lambda_o$. The fact that the higher-order peaks in FIG. 5 are low-amplitude indicates that the deviation of the film from sinusoidality is relatively small. It is anticipated that an accurate sinusoidal pattern for the refractive index profile can be achieved by using a monitoring and feedback loop control system for measuring refractive index and thickness of the film as deposited. The more accurate the sinusoidally modulated index profile, the higher the reflectance value at the fundamental wavelength.

In addition, with regard to FIG. 5, the absence of a measured reflectance peak at $\lambda_o/3$ (0.5 $\mu$m), which is characteristic of a multilayer structure, indicates that this coating is not a discrete-layer quarterwave stack, and is consistent with the result predicted for a sinusoidally modulated film.

The above-described theory and calculations can be used to determine the feasibility of fabricating other narrow band, high reflectance spectral filters by the process of the present invention. For example, using such calculations, it has been determined that a coating design with reflectivity of 99.97 percent at 0.53 $\mu$m can be achieved with a sinusoidal index profile having a modulation of 0.105 and a thickness of 15 $\mu$m. It has also been determined that as the film thickness increases, the index modulation can be reduced and applied for an increased number of cycles, while still maintaining the required reflectivity. Another factor for consideration is the reflectance bandwidth. The larger the index modulation, the wider the reflectance bandwidth at a given thickness or at a given efficiency level, which causes reduced photopic see-through or signal transmission. As another example, it has been determined from such calculations that an optical coating design with a reflectivity of 99.93 percent at 1.315 micrometers can be achieved with a graded index layer of $SiO_x$ having a sinusoidal profile, with an index modulation of 0.42, a thickness of 8.2 micrometers, and a modulation period of 0.396 micrometers.

Figure 7:
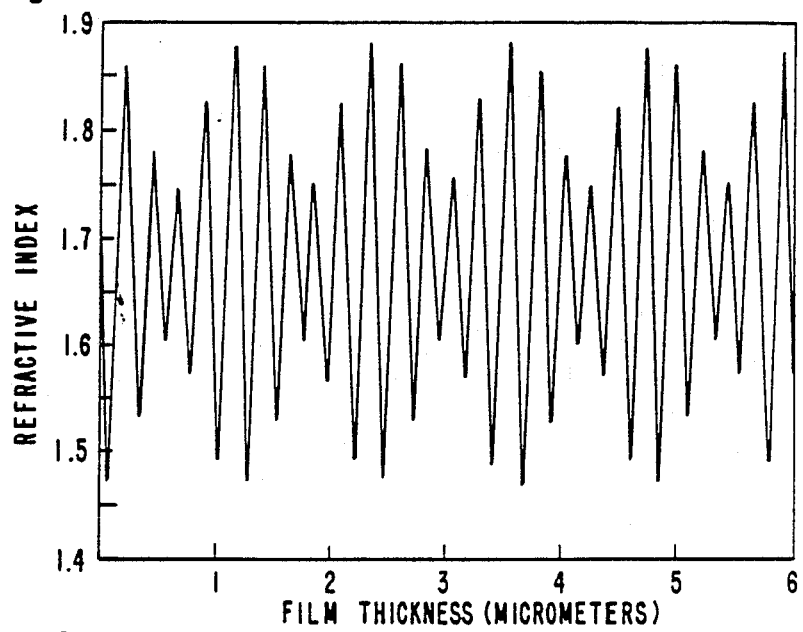
Figure 8:
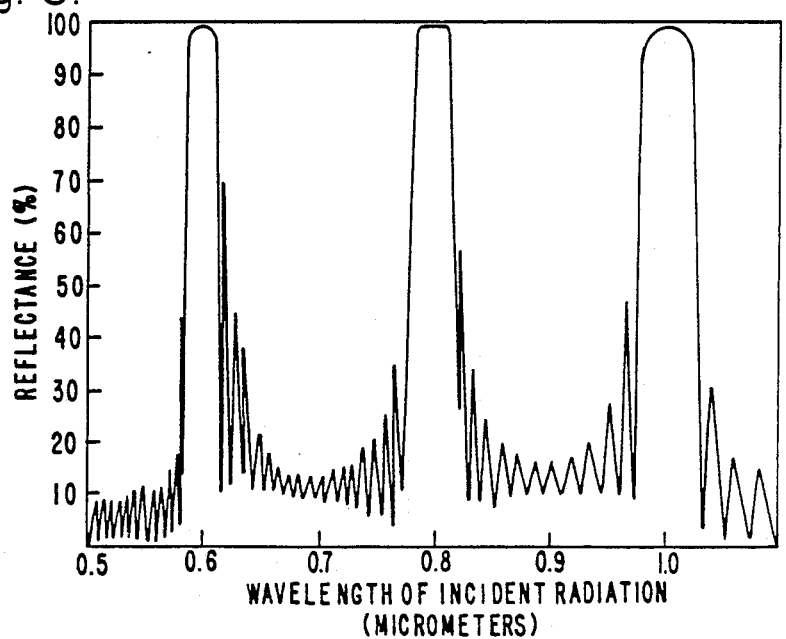
FIG. 8 presents the spectral response for such a composite index filter.

Furthermore, in accordance with the process of the present invention, there may be formed a coating with a composite index profile which is the linear superpositioning of a number of sinusoidal index profiles and which exhibits high reflectance at multiple wavelengths corresponding to the individual sinusoidal index profiles. This kind of composite profile can be designed analytically as described above and fabricated using the graded index process of the present invention. For example, the three separate index profiles required to provide protection against three separate wavelengths of radiation at 0.6 $\mu$m, 0.8 $\mu$m, and 1.0 $\mu$m are combined to form the composite refractive index profile versus film thickness shown in FIG. 7. Using the composite profile index of FIG. 7 for a total film thickness of 16 micrometers on a glass substrate, the theoretical reflectance of such a device at various wavelengths is shown in FIG. 8. The extremely high reflectance at 0.6 $\mu$m, 0.8 $\mu$m, and 1.0 $\mu$m is evident in FIG. 8. In a similar manner, other coatings may be formed with other index profiles which are analytically synthesized to provide particular optical characteristics.

In addition, the photochemical vapor deposition process of U.S. Pat. No. 4,371,587 can be used to produce many different oxide films, such as $SiO_2$, $TiO_2$, $Al_2O_3$, $Ta_2O_5$, and $SnO_2$. Further, such a process can be used to provide a film structure that consists of two oxides with compositions that change gradually and continuously from one oxide to another. For a composite oxide film of $SiO_2$, with a refractive index of 1.45, and $TiO_2$, with a refractive index of 2.55, the maximum index modulation achievable is 1.1, as compared to the 0.45 modulation achieved in the $SiO_x$ oxide system. The indices of some other useful oxides are 1.76 for $Al_2O_3$, and 2.18 for $ZrO_2$.

Finally, as a practical matter, preliminary analysis has shown that the tolerance on the thickness and index variation are higher for the graded index film structure of the present invention than for a prior art multilayer quarterwave stack coating. It is anticipated that if a reasonably precise monitoring system for thickness and refractive index is installed, the photochemical vapor deposition process of the present invention will produce coatings with excellent reflectance, and showing minimum degradation due to the random error associated with the deposition process.

There are several advantages in forming a reflective diffraction optical element for use as a filter by the process of the present invention. First, the filter is formed of an oxide material which is inherently stable in high humidity and over a wide temperature range, whereas conventional gelatin holograms are not. In addition, the $SiO_x$ formed by the photochemical vapor deposition process has exhibited superior adhesion on glass, as well as plastics such as polycarbonate, and conforms to the shape of the substrate surface. The latter two properties make the process of the present invention particularly well suited for the fabrication of head-up display combiners or night vision visors on curved substrates. Moreover, the $SiO_x$ of the present invention can be deposited at a temperature sufficiently low (e.g. 30° to 200° C.) so as to avoid thermal degradation of a plastic substrate, which makes possible the use of light weight plastic substrates in laser eye protection devices and head-up display devices. Further, the $SiO_x$ formed as described herein possesses excellent optical and mechanical properties, such as good surface morphology and low pinhole or defect density, which result in reduced optical scattering. In addition, the low defect density of such an oxide makes it less susceptible to laser radiation damage. Further, by the process of the present invention, a continuously graded index optical material is deposited, and, thus, avoids the previously discussed prior art problems, such as reduced transmission, optical scattering, and thermal damage, caused by the juxtaposition of discrete layers of differing composition. By using the continuously graded index reflective coating of the present invention, the prior art problems of localized concentration of mechanical stresses as well as a concentration of the electric field are avoided. It has been analytically determined that the peak electric field in a filter with a sinusoidal profile is less than the peak electric field encountered in a square-wave multilayer filter having identical optical properties at the desired wavelength. In addition, the gradual change in composition in the material formed in accordance with the present invention reduces the thermal stress in the film when subjected to the high laser energy flux. This reduced thermal stress is expected to increase the laser damage threshold. The gradual compositional change may also reduce the absorptance of the film. In addition, a better thermal match with the substrate may also be attained by adjusting the composition of the dielectric at the substrate interface so that the substrate and dielectric have compatible thermal expansions.

Moreover, the index of refraction of the material deposited in accordance with the present invention can be adjusted to a predetermined profile, which permits greater flexibility in the design of the optical element. In particular, the optical element of the present invention can be formed as a non-sinusoidal profile to provide high reflectance at several wavelengths, as previously discussed with regard to composite index profile devices. These latter devices are novel optical devices which have not been possible heretofore, such as a multiple-wavelength narrow band reflective diffraction optical element incorporated in a single deposited layer, which is useful in two-color head-up display combiners, laser eye protection visors, and reflective coatings on laser mirrors. In addition, the periodicity of the profile can be changed to reject any predetermined laser line within the spectral band of the deposited material, e.g. a peak wavelength from 0.3 to 2.5 m for $SiO_x$. Further, because the optical devices of the present invention can be constructed to provide high reflection of radiation within a narrow bandwidth, such devices have high transmission of the signal of interest and enhance the efficiency of signal detection. In addition, the devices of the present invention can provide high reflection over a wide wavelength region (e.g., 0.3 to 2.5 micrometers or greater for $SiO_x$ or up to 5 micrometers for $Al_2O_3$).

Further, the continuously graded index filters of the present invention can be fabricated by a photochemical vapor deposition process which is charge-free and avoids charge damage or radiation damage to sensitive devices, such as charge-coupled devices and compound semiconductor devices. In addition, such a process is performed at a low temperature, e.g., 30° to 200° C., and avoids thermal damage to temperature-sensitive substrates, as well as stress caused by thermal mismatch of the substrate and deposited layer. Moreover, the material deposited by this photochemical vapor deposition process has excellent surface morphology, low pinhole density, low impurity content, low stress, large area uniform thickness, and conformity to substrate shape. The process of the present invention is highly reproducible and capable of large-scale production of uniform deposits. Finally, by the above-described process, a filter can be fabricated by a single step process, which reduces fabrication complexity and cost. It is particularly noteworthy that by the process of the present invention a filter which protects against multiple wavelengths of radiation can be fabricated in a single device by a single step process.

Further, the process of the present invention may be used to form a reflective coating on the surface of a mirror substrate to provide a surface with high reflectivity, low absorption, and low scattering. Such a highly reflective film is useful on mirrors provided in laser systems to reflect and guide the laser beam. In order to form such a reflective coating, the process previously described herein with particular reference to FIG. 5 is performed on a molybdenum or silicon mirror substrate, for example. The reflectance of this coating was measured at various wavelengths of incident radiation and the results are as shown in the curve of FIG. 5 previously discussed. In order to improve adhesion and decrease stress, it may be advantageous in some cases to use a binder material, such as chromium or titanium, between the substrate and the graded index material. Such a metal binder may also be used to reduce the thickness requirement of the deposited film at a particular index modulation.

Furthermore, in accordance with a second process embodiment of the present invention, a continuously graded index optical material may be deposited by the photochemical vapor deposition process previously described herein except that a scanning laser beam or other collimated beam is used as the source of radiation to initiate the desired chemical reaction. The laser beam may be scanned across the surface of the substrate or other means may be used to effect relative movement of the laser beam with respect to the substrate, such as moving the substrate or adjusting the optical focusing system, as is known in the art and described, for example, in U.S. Pat. No. 4,340,617. The laser beam or other collimated beam used has an output at the wavelength of radiation required to induce the desired photochemical reaction, as previously discussed herein. The beam is scanned across the surface of the substrate in a controlled manner so that one segment of the substrate at a time is exposed to the beam, with the segment size being determined by the beam diameter. The rate of deposition of the reaction product depends on the amount of reaction-inducing radiation to which the reactants are exposed. Consequently, if a given segment of the substrate has a longer exposure to the laser beam, that segment will have an increased amount of reactive product deposited thereon. Thus, a spatial variation of the deposition rate over the horizontal surface of the substrate can be achieved by controlling the scanning speed or duty cycle and pattern of the laser beam. Since the deposition rate determines the thickness of the deposited layer, the thickness of the deposit and the refractive index thereof are likewise varied over the lateral surface of the substrate in accordance with the above-described scanning laser beam exposure. This variation in thickness may be in a continuous manner or in a stepped manner, as determined by the scanning pattern of the laser beam. The resulting structure has a continuously graded index layer as a function of thickness as previously described herein, and, in addition, the thickness of that layer varies in a predetermined pattern across the surface of the substrate. Since the amount of modulation within a given thickness determines the periodicity of the index modulation, the deposited layer on different segments of the substrate surface will have different periodicities. As previously discussed with regard to Equation (5) herein, the periodicity of the index modulation determines the peak wavelength of reflected radiation. Consequently, in accordance with this second process embodiment of the present invention, a diffraction optical element may be formed to have different peak wavelengths of reflection and/or thickness at various segments of the substrate surface. Such a structure is useful as a combiner in a head-up display system. Alternatively, in accordance with the second process embodiment of the present invention, the amount of reaction-inducing radiation to which predetermined segments of the substrate are exposed may be varied by using a flood source of ultraviolet radiation and a mask placed close to the substrate surface to prevent the radiation from striking the substrate at predetermined segments. The first and second process embodiments of the present invention may be used to provide various optical elements with varying thickness and/or refractive index across the horizontal surface thereof, in addition to the modulated refractive index as a function of thickness as previously described. In one case, the refractive index is modulated as a function of thickness to provide a chosen $\lambda_p$ as described with regard to the first process embodiment and, in addition, the thickness of the deposited layer is varied in a desired pattern, such as to form a convex surface, as described above with regard to the second process embodiment. The resulting structure has a horizontal variation in thickness and the same $\lambda_p$ across the horizontal surface of the structure. A structure having such a variation in thickness provides a change in the efficiency of the diffraction element across the horizontal surface thereof, which is advantageous for compensating for spatial nonuniformity in the intensity of the incident radiation. In a second case, the thickness of the deposited layer is varied in a desired pattern as described immediately above, and, in addition, $\lambda_p$ is varied across the horizontal surface of the layer as previously described with respect to an alternative of the first process embodiment of this invention. The resulting structure has a horizontal variation in thickness and variations in $\lambda_p$ across the horizontal surface of the structure. In a third case, the thickness of the deposited layer is held constant and the refractive index of the deposited layer is varied across the horizontal surface of the substrate to produce variations in periodicity and $\lambda_p$, as described above. In such a structure, variations in $\lambda_p$ across the horizontal surface of the substrate are not dependent on the thickness of the deposited layer. The constant thickness of such a structure may be achieved by placing a cover with an iris opening over the substrate and opening or closing the iris over a given segment of the substrate to control the amount of radiaton striking the substrate segment, while at the same time altering the intensity of the radiation or the reactant gas flow rates in order to achieve the required modulated refractive index as a function of thickness and as a function of horizontal position on the substrate surface.

In summary, the following are some of the unique characteristics of the process of the present invention which provide conventional optical filter devices with improved performance, as well as novel filter devices heretofor unavailable:

a. arbitrary profile of (complex) refractive index modulation by control of reactant flow rate ratio;
 b. high index modulation;
 c. variable peak wavelength across the surface of the substrate;
 d. low temperature deposition;
 e. uniform coating conformed to substrate shape; and
 f. versatility in deposition materials.

In particular, some of the new and improved optical devices which may be formed in accordance with the present invention are:

a. wide angle optical filters with variable $\lambda_p$ across the filter for wide angle receptions, such as bandpass filter, narrow band transmission or reflection filter, cut-off filter;
 b. absorption or transmission type apodizer to provide even intensity across the resultant beam, such as variable density neutral density transmission filter, variable reflection filter;
 c. surface grating with grating profile shaped by the UV light profile and/or the variable index through grating depth;
 d. variable index coating on substrates or fiber cores to form special optical devices, such as optical fibers or integrated optics elements;
 e. element for replication of masks and computer generated holograms;
 f. IR and visible filter for laser hardened IR detector and solid state components, such as a laser protection filter for detectors, or for personnel laser eye protection;
 g. narrow band, single color or multi-color, transmission or reflection or cut-off type filters;
 h. thin lens with variable surface profile and variable index throughout or across the lenses;
 i. anti-reflection, or high reflectivity filters on plastic substrates or on glass substrates;
 j. any of the above coatings on aspheric substrates; and
 k. slanted fringe optical devices.

Moreover, the process of the present invention is not limited to the use of oxides of silicon, but may include any of the oxides which may be deposited by the process disclosed in U.S. Pat. No. 4,371,587, previously referenced herein. In addition, other materials besides oxides may be deposited as described herein by other photochemical processes, such as silicon nitride by the process disclosed in U.S. Pat. 4,181,751, assigned to the present assignee, and various sulfides by the process disclosed in U.S. Pat. 4,447,469, assigned to the present assignee. Further, combinations of these various materials may be used, such as silicon dioxide in combination with silicon nitride. As a practical matter, the material deposited in accordance with the present invention must be stable in the presence of air and water vapor.

Furthermore, the present invention is not limited to photochemical vapor deposition processes, but includes other known deposition processes in which the reactant gas flow rate ratios are controlled as described herein to provide a continuously graded index optical material with a predetermined index profile. For example, in a thermal chemical vapor deposition process in which reactants are heated to a sufficiently high temperature to bring about a chemical reaction to form a desired product, the gas flow rate ratio of the reactant gases is controlled in the manner previously discussed herein. A type of thermal chemical vapor deposition of particular interest in this regard is the deposition of an epitaxial layer by metallo-organic chemical vapor deposition. In a thermal evaporation or physical vapor deposition process in which two sources, such as zinc sulfide and zinc selenide, are heated to produce evaporation thereof and subsequent condensation on the substrate, the thermal evaporation of one source, such as zinc sulfide, is held at a constant rate while the thermal evaporation of the second source is varied as a function of time, in the manner discussed herein. Similar methods can be used in electron beam evaporation techniques and sputter evaporation techniques using two targets. Likewise, in a molecular beam epitaxial growth process in which an epitaxial layer of a material is grown by causing beams of atoms or molecules to impinge on the target, the relative proportion of the impinging beams can be altered as described herein to provide an epitaxial layer having a graded refractive index in a predetermined pattern.

EXAMPLE 1

This example illustrates the formation of a continuously graded index optical material in a predetermined pattern suitable for use as a filter, in accordance with the first process embodiment of the present invention as previously described herein. The photochemical vapor deposition process and apparatus described in U.S. Pat. No. 4,371,587, previously referenced herein, were used to deposit a film of $SiO_x$ on a glass slide substrate having dimensions of 2 inches (5.08 cm) by 3 inches (7.62 cm) and 40 mils (0.10 cm) thick. The vapor phase reactants were silane ($SiH_4$) and nitrous oxide ($N_2$), and mercury was used as a photosensitizing agent. The reaction-inducing radiation was at a wavelength of 2537Å; the substrate temperature was 100° C.; and the total operating pressure was approximately one torr (millimeter of mercury). Alternatively, an operating pressure within the range of about 0.1 to 50 torr may be used. The reactant gases SiH₄ and N₂O entered at one end of the deposition chamber through mass flow controllers which control the flow of the reactant gases. The flow of reactant gases was initiated and followed by adjustment of total pressure, gas flow rates, gas flow ratios, and substrate temperature. Gas pressure during deposition was kept constant and the substrates were positioned so that there was minimum disruption of the laminar gas flow pattern. Upon system equilibration, the deposition of $SiO_x$ was initiated by transmission of the reaction-inducing radiation into the reaction chamber, using the data of FIG. 3, previously discussed, to determine the required intensity of light. A bank of four low-pressure mercury vapor lamps, obtained from Canrad-Hanovia, Inc. of Newark, N.J., was used as the source of light and was located approximately 2.75 inches (6.99 centimeters) from the substrate surface. The gas flow rate of N₂O was held constant at 62.0 sccm and the gas flow rate of SiH₄ was varied in a controlled manner from 0.90 sccm to 3.5 sccm.

Using the previously discussed data of FIG. 1 and a graph generated from experimental data to show the change in flow rate with time, the flow rate of the silane reactant was altered with time by manual turning of the gas flow controller knob at a predetermined rate to produce an oxide film with a refractive index that varied in a continuous sinusoidal pattern from 1.45 to 1.63, for a total of 16 periods, producing a peak wavelength at 1.48μm. The measured spectral reflectance of the holographic filter so formed is presented in FIG. 5, showing an 81.3 percent peak efficiency, and this data has been previously discussed in detail. Such a structure is useful, for example, as a highly reflective coating on the surface of a mirror used in a laser system, in order to provide maximum transmission of the laser signal and minimum laser damage to the mirror.

EXAMPLE 2

This example illustrates the formation of a layer of a contiuously graded index optical material on the surface of a substrate in accordance with the process of the present invention, in which a composite oxide film of silicon dioxide (SiO₂) and titanium dioxide (TiO₂) is formed, to provide a maximum refractive index modulation of 1.1.

The process described in Example 1 above is followed except that titanium tetrachloride (TiCl₄) is used as an additional vapor phase reactant. As described in U.S. Pat. No. 4,371,587, the atomic oxygen formed by the photochemical dissociation of the nitrous oxide reacts with the TiCl₄ to form titanium dioxide. In accordance with the present invention, the gas flow rate of nitrous oxide is held constant and the gas flow rates of SiH₄ and TiCl₄ are varied in a controlled manner with respect to each other and with repect to the nitrous oxide. The required flow rates of the SiH₄ and TiCl₄ are determined from experimental data which indicate the dependence of the refractive index of the deposited material on the flow rates. The SiH₄ and TiCl₄ reactants each react with the atomic oxygen to form SiO₂ and TiO₂, respectively, which deposit simultaneously on the substrate to provide a composite oxide film comprising SiO₂ and TiO₂. The composition of the composite oxide may vary from pure SiO₂ with a refractive index of 1.45 along the continuum to pure TiO₂ with a refractive index of 2.55. The resulting composite oxide film has a continuously graded refractive index as a function of thickness, with a maximum index modulation of 1.1.

EXAMPLE 3

This example illustrates the formation of a layer of a continuously graded index optical material on the surface of a glass substrate in which the index also varies in a predetermined pattern across the surface of the substrate, in accordance with the second process embodiment of the present invention as previously described herein. The general procedure described in Example 1 is followed except that the source of radiation is a scanning laser beam comprising an argon-fluoride tunable excimer laser and associated electronics and optics obtained from Lumonics of New Jersey and a raster scanning mechanism obtained from General Scanning, Inc. of Watertown, Mass. Under computer-control, the laser beam is scanned in a predetermined pattern across the horizontal surface of the substrate, as described in U.S. Pat. No. 4,340,617, for example. There is deposited on the substrate a layer of a material, such as $SiO_x$, which has a continuously graded refractive index as a function of the thickness of the deposited layer and also a graded refractive index radially across the horizontal surface of the substrate in a pattern corresponding to the pattern of the scanning laser beam.

While the present invention has been particularly described with the respect to the preferred embodiments thereof, it will recognized by those skilled in the art that certain modifications in form and detail may be made without departing from the intention and scope of the invention. In particular, the scope of the invention is not limited to the photochemical vapor deposition of a continuously graded index layer of oxides of silicon, which was used merely as an example, but is intended to include oxides, nitrides, sulfides, and other materials and combinations thereof, with suitable optical properties. In addition, while the preferred process embodiment of the present invention has been referred to as a "photochemical vapor deposition process", it is not intended to limit the present invention to the process embodiment of U.S. Pat. No. 4,371,587 in which atomic oxygen is photochemically generated; rather it is intended to include any oxide formed by any process embodiment of the latter patent.

Moreover, while the present invention has been described with reference to a particular photochemical vapor deposition process which is specifically controlled in order to form an oxide having a continuously graded refractive index in a predetermined pattern, it will be recognized that other known deposition processes for forming oxides, as well as other materials, may be similarly controlled to achieve a deposited layer having the same graded index profile and optical properties as described herein. Other materials which may be used to form the graded index layer are characterized by being dielectrics which are transmissive in the wavelength range of interest.

Further, the present invention is not limited to the particular refractive index profiles specifically disclosed herein, but is intended to include any predetermined profile. In addition, it is not intended to limit the present invention to the particular process details described herein, but to include any variations in process parameters as may be required in order to achieve the desired refractive index profile in the deposited material.

Finally, the present invention is not limited to the uses of the continuously graded index materials as specifically set forth herein, but includes structures comprising such continuously graded index materials which may be used for any purpose.

Figure 9:
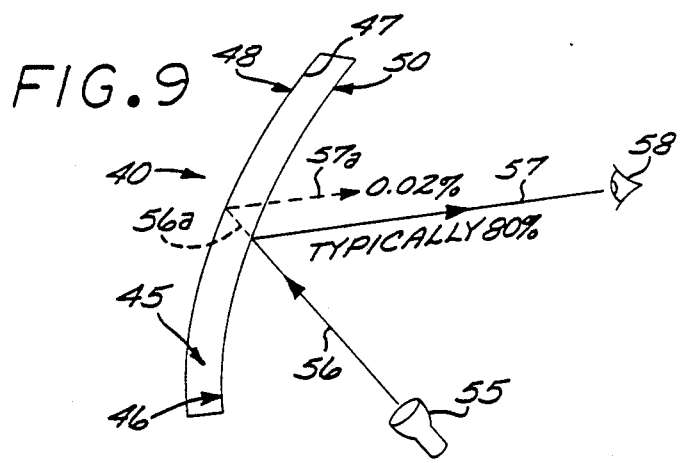
FIG. 9 is a schematic diagram of an optical combiner having an aspheric substrate structure and a diffraction coating formed on the surface thereof.

Referring now to FIG. 9, a novel diffraction-type optical combiner is disclosed. The improved performance and relatively simple structure of the combiner 40 are well suited for applications such as HUDs or HVDs. The combiner 40 illustrated in FIG. 9 comprises a substrate 45, fabricated from a material such as glass or plastic. A diffraction coating 50 is formed on the surface 46 of the substrate, and may comprise a gelatin hologram or a graded-index coating. The graded-index coating is preferably formed in accordance with the photochemical vapor deposition process described hereinabove or some other deposition process. An antireflective coating 48 is formed on the other surface 47 of the substrate 45.

The surfaces 46 and/or 47 can have a plane or spherical contour, but preferably have an aspheric contour selected to compensate or balance aberrations in the display system in which the combiner 40 is employed. The coating 50 can provide a narrow band, high reflectivity response, similar to a conventional gelatin hologram formed on a spherical substrate. However, the gelatin hologram coating has improved optical performance over conventional gelatin holograms formed on spherical substrates. This improved performance results from the elimination of the slant fringes, the substrate contour providing the asphericity necessary for aberration compensation rather than the hologram itself. The considerations and principles which enter into determining the specific shaping of the aspherically contoured surface needed to achieve given design criteria are the same well-known considerations and principles which enter into determining the desired orientation of the fringes in a gelatin hologram with, of course, appropriate conventional compensation for any differences in refraction due to changes in the medium.

The added flexibility in the coating design and fabrication using graded index coatings allows the production of improved performance combiners, such as those used to make high see-through and multiple color displays, and thus has certain advantages over the gelatin hologram coating.

The graded-index coating can be applied directly on plastic surfaces such as polycarbonate, and is inert to environmental effects such as humidity and temperature in the normally specified ranges, unlike the gelatin hologram. These two characteristics enable the graded-index coating to be applied directly to the surface 46 of the substrate 45, which provides a major optical advantage. Since the surface 46 is the surface facing the observer's eye 58, as illustrated in FIG. 9, the combiner 40 substantially reduces the strong displaced second (ghost) image often encountered with a laminated gelatin holographic combiner. The intensity of the reflection from the second surface 47 is generally several orders of magnitude down from the intensity of the main image reflected from surface 46 and, therefore, is not a significant problem affecting the practical use of the combiner in a HUD or HVD system. Moreover, the antireflective (AR) coating 48 is applied only to surface 47 of the substrate 45, while the gelatin type of HUD or visor combiner requires AR coatings on both sides of the combiner.

The reduction in intensity of the ghost image is illustrated in FIG. 9. The display light source may typically comprise a CRT 55. The narrow band light generated by the CRT is incident on the combiner 40 along ray 56.

The coating 50 may typically be adapted to reflect 80% of the incident light from the source 30 back along ray 57 to the observer's eye 58. The small portion of the display source light which is not reflected by the coating 20 is transmitted along ray 56a to the interface of the substrate 45 and the AR coating 48. A typical AR coating typically reflects only about 0.5% of the incident light and transmits the remaining light. The reflected light travels along ray 5a. The coating 50 reflects 80% of the light incident along the ray 57a and transmits only 20% of the incident light. The intensity of the second image along ray 57a is only (20%) (0.5%) (20%), or 0.02% of the intensity of the light incident on the combiner 40 from source 55. Thus, the intensity of the reflected second image is far less than the intensity of the primary reflected image.

The ghost image performance of the combiner 40 illustrated in FIG. 9 is contrasted with a conventional gelatin holographic combiner, comprising at least five layers, two outer AR coatings formed on outer surfaces of two glass substrates, which in turn sandwich the gelatin hologram. Even assuming comparable performance for the AR coating (0.5% reflectivity) and 80% reflectivity for the gelatin hologram at the wavelength of the source light, there are now five interfaces to be considered, and three significant components of the displaced image. The combined intensity of the three secondary components is 0.84%, or a factor of 40 higher as compared with 0.02% for the combiner shown in FIG. 9.

The combiner illustrated in FIG. 9 can also provide improved see-through performance, larger exit pupil size, multiple color and optimized display efficiency. These improved performances directly result from the flexible design and fabrication processes achievable through deposition techniques such as the photochemical vapor deposition process described above, which are capable of depositing coatings with graded-index profiles.

For HVD or HUD applications, it is desirable for the viewer to see clearly the external environment through the visor or HUD combiner and that the color of the external scenes not be tinted by the combiner. This requires that only a small portion of the external light incident on the combiner be reflected by the diffraction coating on the combiner. If the reflectivity response of the combiner is not narrow band, or if there are significant sidelobes in the reflectivity response about the peak efficiency wavelength, then the external environment will appear tinted to the viewer and the see-through performance of the combiner will be degraded.

The index profile of a graded-index coating can be designed to provide a narrow band, high reflectivity spectral response with side-lobe reflection minimized so that the see-through performance is improved. This feature is illustrated in FIGS. 10 and 11.

Figure 10:
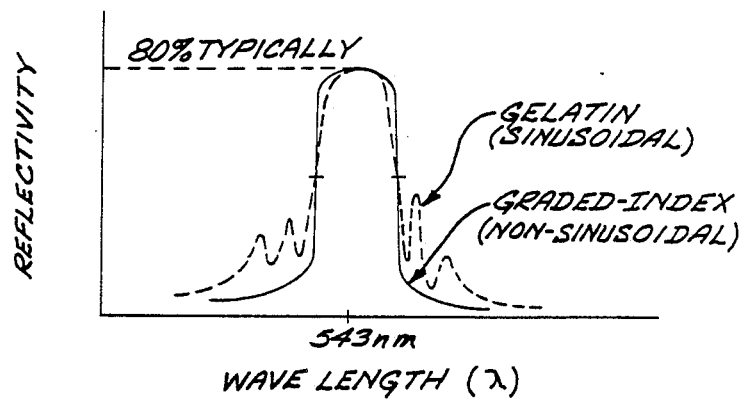
FIG. 10 shows curves of the spectral reflectivity function of a typical gelatin hologram (broken line) with a sinusoidal index profile and a graded-index coating (solid line) with a non-sinusoidal index profile.
Figure 11:
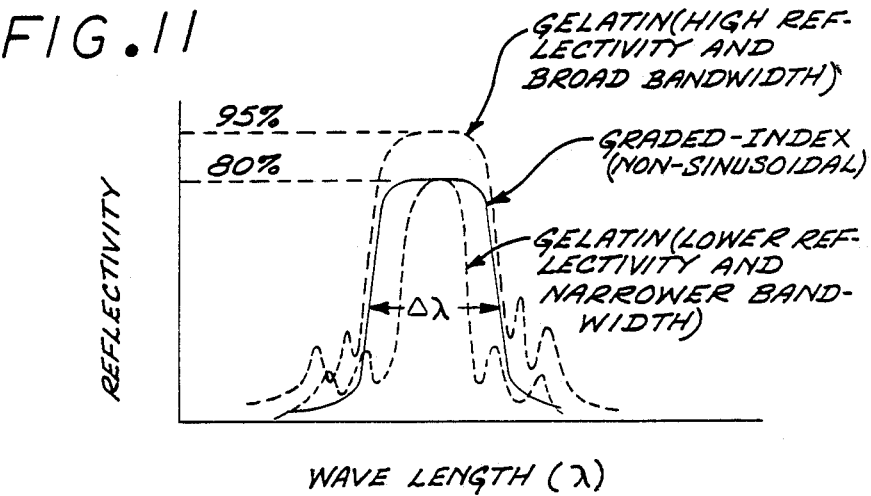
FIG. 11 shows curves of the spectral reflectivity function of typical gelatin holograms with sinusoidal index profiles (broken line), one designed to have a broad spectral bandwidth relative to the other, and a graded-index coating with a non-sinusoidal index profile (solid line) designed to have a broad spectral bandwidth.

FIG. 10 is a graph plotting the reflectivity function of both conventional gelatin holograms and graded-index holograms as a function of the wavelength of the incident light. In FIG. 10 the reflectivity of the gelatin hologram is indicated by the broken line and the reflectivity of the graded-index coating is indicated by the solid line. The index profile of the gelatin hologram is sinusoidal. However, the graded-index coating is designed to have a non-sinusoidal profile which will yield suppressed sidelobes in the spectral reflectance profile of the coating. Typical peak reflectivity values of 80%, centered at 543 nm, are readily achievable by both types of coatings. However, the gelain hologram reflectivity exhibits typical sidelobes of appreciable reflectivity for light outside the narrow band wavelength range of interest. The sidelobes in the reflectivity function indicate that considerable light from the external environment will be reflected by the combiner and not transmitted to the observer's eye, thus degrading the see-through performance. On the other hand, the graded-index coating can be designed and fabricated to minimize the sidelobes in the reflectivity response, so that the see-through performance is improved.

By employing a graded-index coating with a particular non-sinusoidal index profile, the peak reflectivity response can be broadened so that a wider bandwidth $\Delta\lambda$ of wavelengths is reflected with at least 80% reflectivity. To achieve a corresponding broadening of the reflectivity response for a gelatin hologram coating would typically require higher peak reflectivity, and consequent increase in the sidelobe level, resulting in undesirable refraction in the sidelobe spectral region. This effect is illustrated in FIG. 11 where the solid line depicts the reflectivity response of a graded-index coating with a non-sinusoidal index profile and the upper broken line depicts the reflectivity response of a gelatin hologram designed to provide the same bandwidth but with higher peak efficiency of 95%.

The graded index coating allows great flexibility in balancing the bandwidth, sidelobe and reflectivity response of the combiner according to the requirements of particular applications. For example, a bandwidth $\Delta\lambda$ (as depicted in FIG. 11) on the order of 20–30 nm can be designed with acceptable reflectivity, and low sidelobe level. This allows the use of the phosphor P53 for the CRT light source, which emits light whose wavelength is centered at 543 nm within 5–10 nm range. This is in contrast to the P43 phosphor which is used in CRTs to emit light at wavelengths centered at 543 nm but within a 2–3 nm range. Thus, with the broadened reflectivity response, the image brightness may be increased.

The bandwidth increase achievable with non-sinusoidal graded-index coatings provides another performance advantage, an increase in the angular reflectivity function. The angular reflectivity function characterizes the reflectivity as a function of the angle of incidence for a given wavelength of the impinging light. If the reflectivity response is high over a wider band of incident angles, the exit pupil size is correspondingly larger.

The increase in exit pupil size can be maximized through control of two parameters. Increasing the magnitude of the index modulation (i.e., the difference between the highest and lowest index) through the thickness of the coating for a given non-sinusoidal, graded-index coating is found to result in broadening of the peak reflectivity response, and correspondingly the angular reflectivity bandwidth. Moreover, the graded-index coating can be fabricated from substances having a higher average index of refraction than the gelatin hologram. For example, a graded-index coating formed from layers of $SiO_x$ and $SiO_2$ can be designed with an average index of 1.75, compared to the typical gelatin hologram with an average index of about 1.50. This results in an exit pupil area which is about 30% larger than the gelatin hologram.

A requirement of a combiner used in a typical display system is that it be able to reflect light from the display source which is incident upon the combiner at angles of incidence which vary as a function of position on the combiner. A holographic or interference-type coating is designed to reflect a narrow band range of wavelengths and to transmit light of wavelengths outside the narrow band range. The narrow band range, centered at a particular wavelength, shifts as the angle of incidence is shifted from the normal direction. The center frequency at normal incidence is typically referred to as the hologram wavelength. Because the display source light typically is not incident normally at the combiner surface, and in fact the angle of incidence varies across the surface of the combiner, the peak wavelength must be varied accordingly across the combiner in order to maximize the display efficiency. Both the holographic gelatin combiner and the graded-index combiner are able to meet this requirement.

Figure 12:
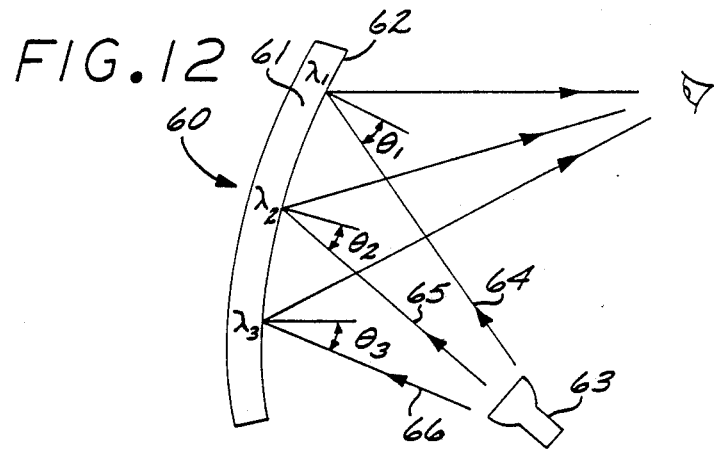
FIG. 12 is a schematic representation of a combiner structure comprising a graded-index coating in which the periodicity (and therefore the peak efficiency wavelength) of the index profile function varies as a function of the surface position coordinates.

The graded-index coating can be generated on the substrate so that the peak efficiency hologram wavelength varies at different points on the combiner to achieve maximum display efficiency in the designed viewing area. This effect is illustrated in FIG. 12. The optical combiner 60 comprises a substrate 61 on which a graded-index coating 62 is formed. A display source 63 generates display light at wavelength $\lambda_o$. Three rays 64, 65, 66 of the display light are shown incident across the surface of the coating 62 formed on the combiner 60. The respective non-equal angles of incidence for rays 64, 65, 66 are $\theta_1, \theta_2, \theta_3$. At the points of incidence, the respective hologram wavelengths are $\lambda_1, \lambda_2, \lambda_3$, designed such that the peak efficiency wavelength reflected back to the observer's eye at the respective non-normal angles of incidence $\theta_1, \theta_2, \theta_3$ is $\theta_o$.

The same effect can be obtained by using an aspheric substrate contour with any diffraction coating, such as a gelatin coating, or to combine the aspheric substrate contour with a graded-index coating.

FIG. 21 is a schematic representation, not drawn to scale, of the graded-index coating applied to a substrate and which varies laterally in stoichiometric composition and refractive index, coating thickness and peak wavelength. The coating 302 is applied to the substrate 304, with lines 306 in the coating indicating constant index contours. The thickness at location $d_1$ is shown as greater than the thickness at location $d_2$, although the difference in thickness is greatly exaggerated, for illustrative purposes.

Thus, the combiner 40, in accordance with the invention, may comprise a substrate having an aspheric surface, and a diffraction type reflective coating for reflecting radiation within one or more predetermined narrow band ranges of wavelengths impinging on the layer. The coating can comprise a gelatin hologram or other type of diffraction coating. The preferred embodiment, however, comprises an aspheric substrate of a lightweight plastic material, on which a graded-index coating is formed. The asphericity can be designed in accordance with the requirements of a specific optical system to compensate or balance optical aberrations in the system. Moreover, the graded-index profile can be designed to provide specific reflectivity responses, to provide multiple color capability, improved see-through, enlarged pupil size, and increased efficiency.

The fabrication of aspheric plastic substrates is well known in the opthalmic art. The aspheric surface is formed, for example, by a casting process, utilizing a master (for example, glass or metal) having the aspheric surface formed thereon by conventional grinding and polishing techniques. The master is then employed to make a nickel plate replica, one for each surface of the substrate (each surface may have a different contour). The nickel plate replicas of the surfaces may then be utilized to cast a plastic substrate.

Figure 13:
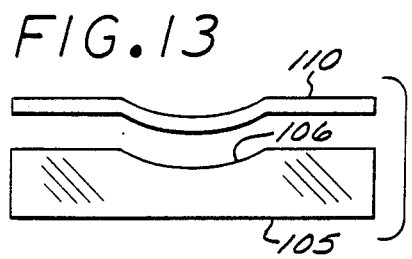
FIGS. 13 and 14 depict structures used in a preferred method to fabricate a plastic combiner substrate having an aspheric surface.
Figure 14:
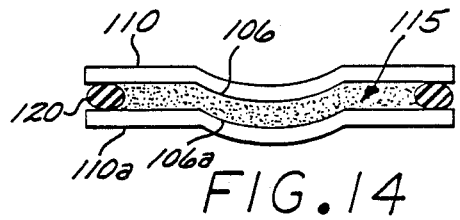

This method for fabricating the plastic substrate is generally illustrated in FIGS. 13 and 14. A desired aspheric surface contour 106 is formed on a glass substrate 105 to define glass master 105. Using the glass master, the nickel plate replica 110 of the surface contour 106 is formed, also by conventional techniques known to those skilled in the art.

By the same process, a second nickel plate replica 110a can be formed using a second master. The two nickel replicas 110, 110a may then be employed as cast surfaces to cast a premeasured quantity of an unpolymerized acrylic (or CR-39) compound 115 into a substrate whose contours replicate the contours of the nickel replica 110, 110a. The casting method includes disposing a compressible gasket retainer 120 around the periphery of the contours 106, 106a, sandwiching the quantity of unpolymerized acrylic compound 115 between the two plates and retained by the gasket 120, setting the plates in an elevated temperature bath so that the acrylic compound polymerizes, usually shrinking by about 13%, to assume the contours 110, 110a. The plates may then be removed from the elevated temperature bath and separated to remove the formed casting The casting method provides a relatively low-cost technique to fabricate the aspheric substrates in production quantities. The parts may also be fabricated by injection molding. In contrast, fabrication of aspheric glass substrates in production quantities would be prohibitively expensive using conventional techniques.

One application to which a combiner as illustrated in FIG. 9 may be advantageously employed is in helmet mounted visor displays (HVDs) used by aircraft flight personnel. As is known, images from a light source such as a CRT may be used to display symbology information or reticle information on a see-through visor, so that the symbology is presented to the helmet wearer as he is viewing the external environment through the visor.

Figure 15:
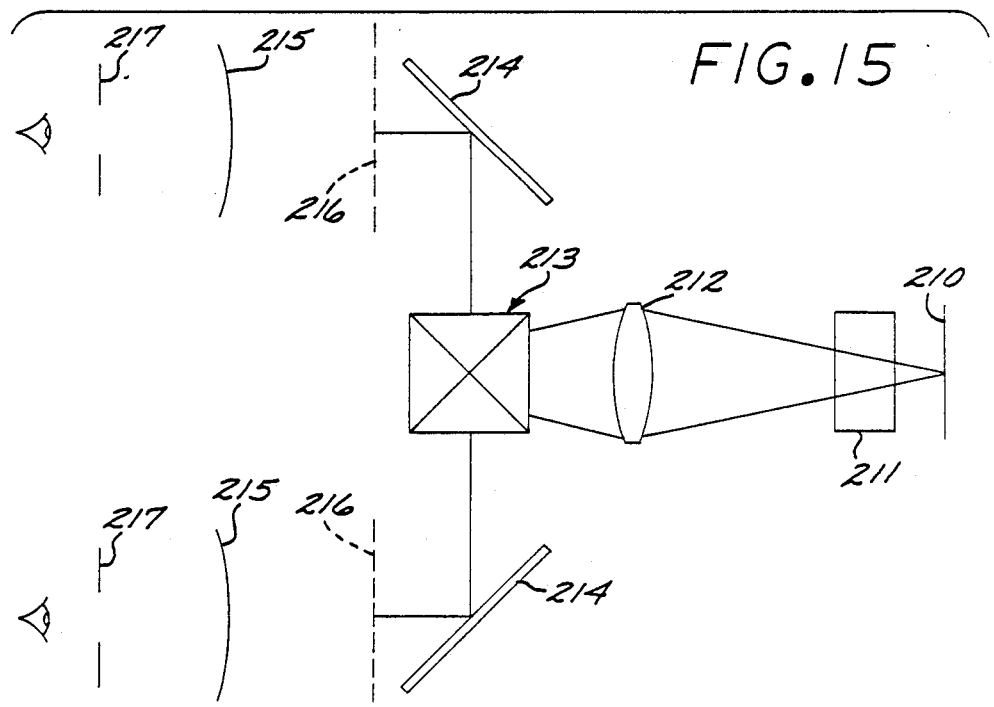
FIG. 15 is a simplified schematic drawing of a helmet visor display system incorporating a novel optical combiner in accordance with the invention.

The general arrangement of a biocular visor system in accordance with the invention is illustrated in the schematic block diagram of FIG. 15. In this figure, light is shown emanating from an object source 210, which may be a CRT, and directed by an image folding prism 211 via a relay lens 212 to a beam splitter 213. The beam path from the source 210 to the image folding prism 211 is shown unfolded for convenience of illustration. At the beam splitter 213, the incident light is split into two beams by splitter 213, which directs the beams laterally to a pair of folding members, shown as wing mirrors 214.

The mirrors 214 redirect the respective beams through a plastic window 216 toward the respective aspheric mirrors comprising the combiners 215 which are optical elements as shown in FIG. 9. The selectively reflective properties of the combiners 215 cause the object source light to be redirected toward the user's eyes through exit pupils 217. Each eye views the image at the corresponding exit pupil as a virtual image at infinity. The intermediate images, represented by the broken lines 216, are developed between the relay lens 212 and the combiners 215.

Figure 16:
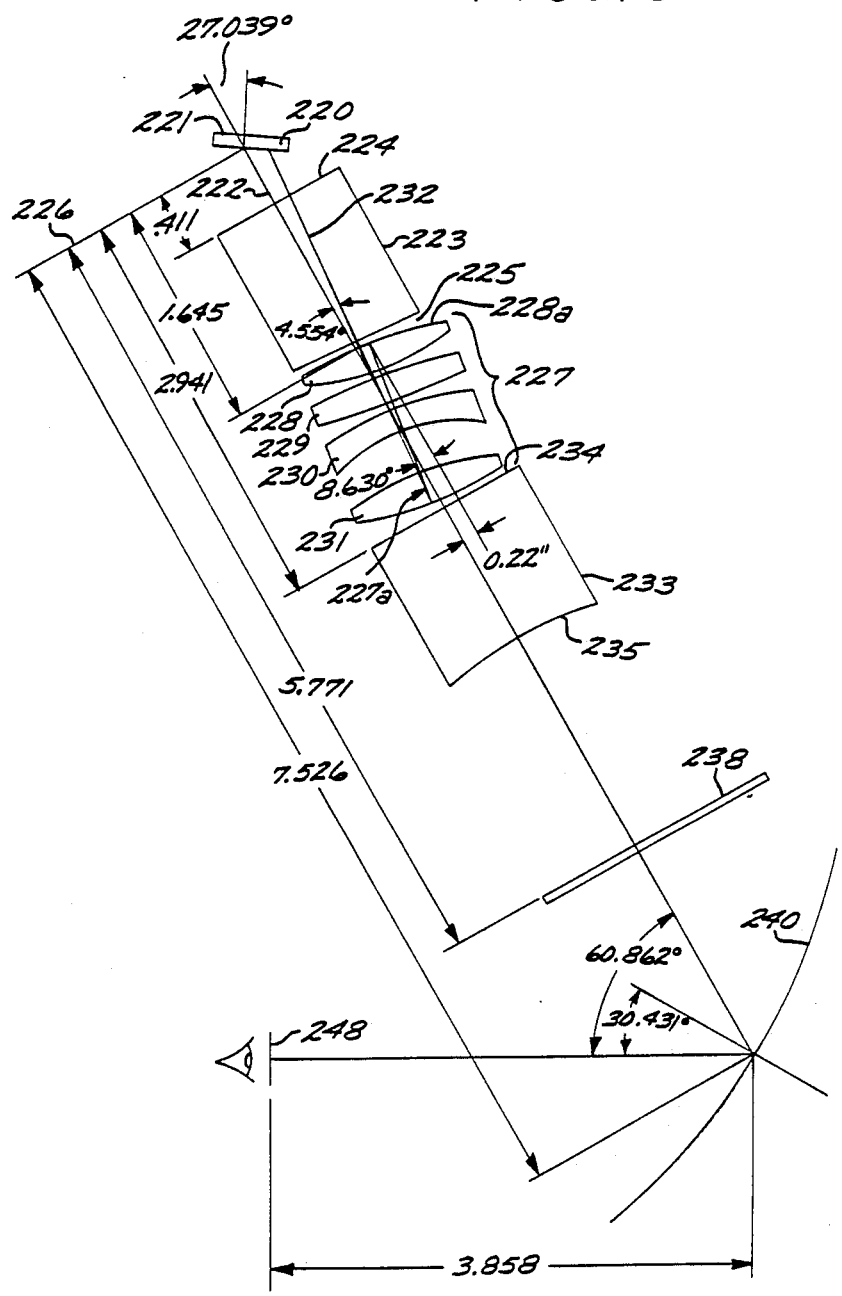
FIG. 16 is a side view of the HVD system depicted in FIG. 15.
Figure 17:
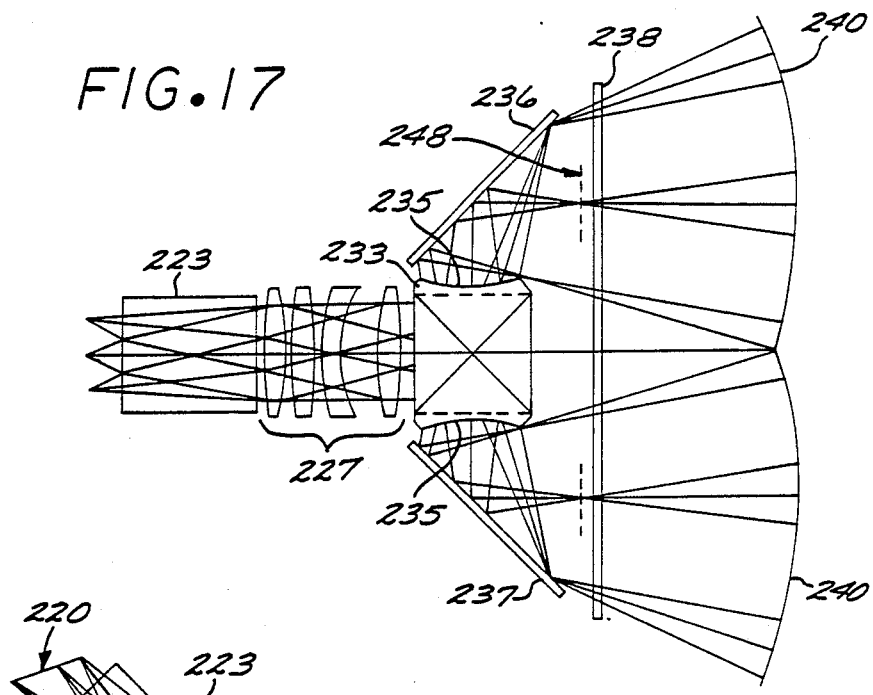
FIG. 17 is an angled side view of the HVD system depicted in FIG. 15, from a plane parallel to a reference line of the system.
Figure 18:
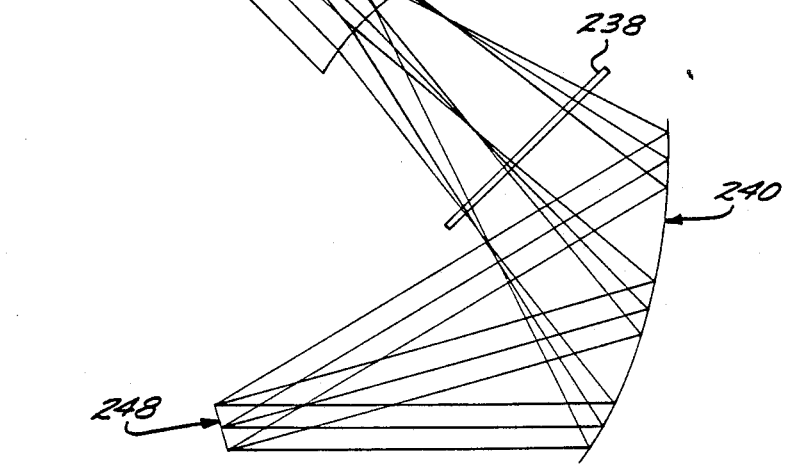
FIG. 18 is another side view of the HVD system depicted in FIG. 15, illustrating the diffraction of image source light rays.
Figure 19:
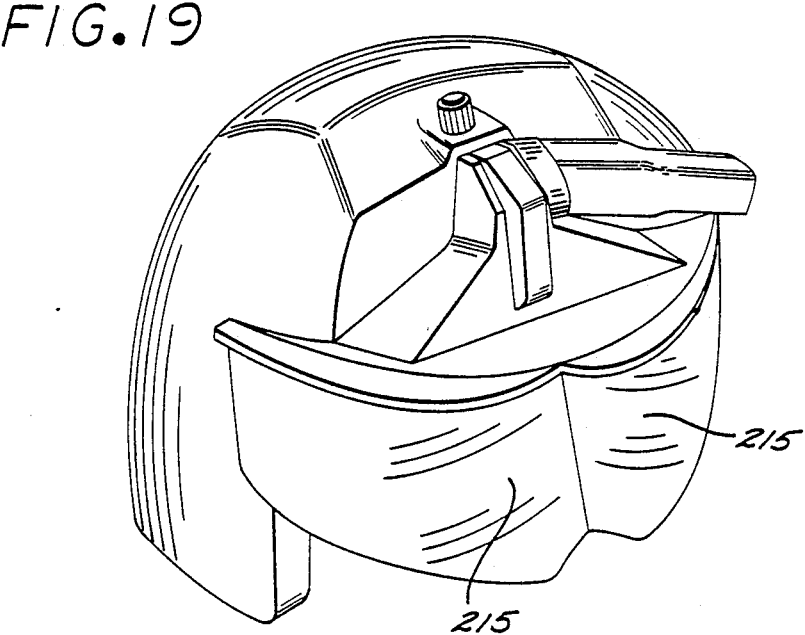
FIG. 19 is a perspective view of the HVD of FIG. 15 shown mounted on a helmet.

One specific, preferred HVD embodiment is represented schematically in further detail in FIGS. 16-18. The arrangement of the principal elements of the biocular system is shown in FIG. 16 in relation to the wearer's head, with the helmet omitted for simplicity. The system comprises a minature cathode ray tube (CRT) source having a flat display element 220 bearing a phosphor on its inner surface 221. As indicated in FIG. 16, the normal to the CRT plate 220 is aligned at 27.039° to the reference line 222 of the system.

Folding prism 223 is adjacent the CRT 220. The entrance face 224 of the prism 223 is orthogonal to the reference line 222, while the exit face 225 is at a wedge angle of 4.554° to the reference line 222. The light from the cathode ray tube is internally reflected within the prism 223 which is spaced so that the entrance face 224 is located at a point which is 0.411 inches from a zero reference line 226, which is orthogonal to the reference line 222 at the outer surface of the CRT face 220.

Next to the folding prism 223 is the relay lens 227 comprising three lenses 228, 229, 230 in a modified Cooke triplet, together with a fourth lens 231. The two outer lenses 228 and 231 of the relay lens 227 have aspheric surfaces while the lens 230 is a meniscus lens with spherical surfaces. The mounting of the relay lens off-axis serves to bend the axial ray 232 into coincidence with the reference line 222.

The light transmitted by the relay lens 227 is then directed to a beam splitting prism 223. The front surfaces 235 (FIGS. 16 and 17) have a concave curvature. The prism 233 splits the light transmitted by the relay lens 227 into a pair of laterally directed images. These images are reflected by wing mirrors 236, 237 (shown in FIG. 17) on opposite sides of the beam splitting prism 233 and sent to the respective combiners 240 through window 238 employed to seal the relay optics from the external environment. Rays from a particular field point are reflected by the combiner 240 toward the user's eye through an exit pupil 248 (represented by lines 248 in FIG. 16 and FIG. 17).

The view in FIG. 17 is taken from the upper right of FIG. 16, parallel to the reference line 222 and the aligned faces of the folding prism 223 and beam splitting prism 233. For simplicity, the wing mirrors 236 and 237 are not shown in FIG. 16.

The axis (represented by line 227a) of the relay lens 227 comprising the lens elements 228-231 is at an angle of 8.630 degrees to the reference line 222, and the point at which the axis 227a intersects the surface 228a is displaced from the reference line 222 by 0.22 inches.

As indicated in FIG. 16, the aspheric lens 228 is mounted such that the point at which its surface 228a is intersected by the axial ray 232 is located 1.645 inches from the zero reference line 226. The faces 234 of the prism 233 is 2.941 inches from the zero reference line 226, while the point at which the reflected axial ray 232 exits the combiner 240 is 7.526 inches from the zero reference line 226. The combiner 240 is oriented such that its element axis in the plane of FIG. 16 forms an angle of 30.431 degrees with the path of the axial ray exiting the combiner 240 (extending in the direction of the exit pupil 248).

The location of the wing mirrors 236 and 237 is limited in the disclosed embodiment by a requirement for a 40° see-through capability and the necessary head clearance. This in turn fixes the location of the beam splitting prism 233. First order and packaging consideration (especially the need for a long back focus to allow the inclusion of the fold prism 223) dictate that the aperture stop fall slightly before the prism 233. This is also one of the positions of the aperture stop for which the relay lens 227 can most readily be designed for superior performance. However, with minor modifications of the design, the aperture stop may be located before or within the relay lens 117 if desired.

Sufficient eye relief has been incorporated into the display system to allow the user to wear glasses and a standard oxygen mask. Given the eye relief and aperture stop location desired, the focal length of the combiner 240 and the magnification of the relay lens 227 are readily determinable. Because the user looks through the combiner 240, see-through distortion is carefully controlled.

A summary of the optical characteristics of the particular embodiment of the display system depicted in FIGS. 15-19 is set forth in Table I.

TABLE I

| Parameter | Value |
| --- | --- |
| System | |
| Horizontal field of view | 40° |
| Vertical field of view | 30° |
| Exit pupil width (truncated circle) | 15 mm |
| Exit pupil height (truncated circle) | 10 mm |
| Effective focal length | 21.6 mm |
| Horizontal f-number | 1.44 |
| Vertical f-number | 2.16 |
| Eye Relief | 98 mm |
| CRT diameter | 19 mm |
| Exit pupil separation | 62.5 mm |
| Wavelength | 542-550 |
| Internal | |
| Combiner focal length | 50.8 mm |
| Combiner f-number | 3.4 |
| Combiner bend angle | 60.8° |
| Relay lens f-number | 1.01 |
| Relay lens field of view | 37° |
| Approximate relay lens width | 29 mm |

It will be apparent to those skilled in the art that the various parameters set forth above with respect to the particular embodiment depicted in FIGS. 15-18 are selected in accordance with acceptable design principles and may be varied in accordance therewith, in a manner well known to those skilled in the art, to adapt the design to various applications and specifications without departing from the scope of the present invention. Other parameters of the system, not specified, such as the prescriptions for the lens surfaces of the relay lens 227 and the surface of combiner 240, may be chosen in accordance with such principles to satisfy any particular design specifications. These principles are understood to those skilled in the art, as evidenced by optical engineering textbooks such as "Modern Optical Engineering," by Warren J. Smith (McGraw-Hill, Inc. 1966). It will also be apparent to those skilled in the art that separate optical channels, each with a design similar to that illustrated in FIGS. 15-17, can be used to provide a separate display to each eye by simply eliminating the foldng mirror 236 and prism 233. This dual separate channel configuration provides the capability for a stereoscopic display system.

The HVD system depicted in FIGS. 15-19 has substantial advantages over the HVD systems employing gelatin holograms. The enhanced optical performance achieved by graded-index combiners is one such advantage. While the specific performance parameters to be optimized are application dependent, it is apparent that the aspheric combiner can be optimized to provide improved image quality substantially resulting from the minimization of the flare and chromatic dispersion inherent in a gelatin holographic combiner, larger exit pupil size, improved see-through and efficiency, larger field of view and elimination of ghost images. Moreover, the combiner can be fabricated from lightweight polycarbonate, substantially reducing the weight of the combiner and the burden on the visor wearer.

Figure 20:
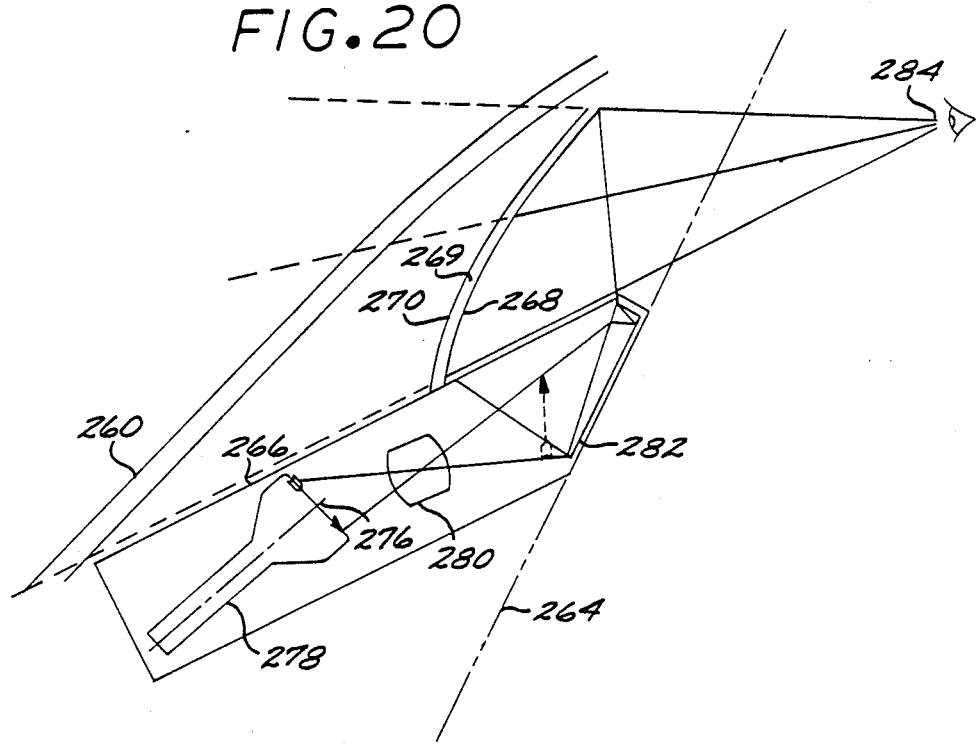
FIG. 20 is a simplified schematic view of a head-up display incorporating a novel optical combiner in accordance with the invention.

Another application for a combiner as shown in FIG. 9 is in head-up displays (HUDs) for aircraft cockpit use. A general schematic diagram of a HUD employing the novel combiner is depicted in FIG. 20. The aircraft has a canopy 260 and a surface 266. A combiner 270 comprises a substrate 269 and a diffraction-type coating 268. A cathode ray tube 278 provides an image source at object plane 276. The object plane is imaged through a relay lens 280 to a folding prism 282 having a surface angled to direct the rays over the surface of the combiner 270. The rays are then diffracted by the combiner 270 to the pilot's eye 284.

A head-up display employing the combiner comprising an aspheric substrate and graded-index diffractive coating has several advantages over systems employing gelatin holographic coatings. One advantage is the weight reduction, resulting from the elimination of the glass layers which are typically employed to protect the gelatin hologram. With a plastic substrate, the weight savings can be significant. Further, the plastic substrate does not present the safety risk of shattered glass inherent in gelatin holograms combiners; with a plastic substrate the combiner is birdstrike safe. This in turn permits the combiner to be located closer to the canopy than is permitted with glass combiners, allowing the design of head-up displays with greater look-up capability. Other advantages of the head-up display system employing the aspheric combiner are reduced see-through distortion and ghost images and improved image quality. Moreover, the lower cantilevered mass of the lightweight combiner increases the stiffness of the combiner and reduces its sensitivity to vibration. The following summarizes some of the advantages resulting from combiners fabricated in accordance with the principles discussed herein:

a. the strong double image due to the first surface reflection in a gelatin combiner is eliminated because the graded-index coating is located on the outermost surface. This placement of the graded-index coating also eliminates the need for an antireflective coating on one side of the combiner;

b. the combiner can provide improved optical performance such as higher see-through efficiency and larger exit pupil area and field of view due to the flexibility in coating design and fabrication;

c. the combiner is a lightweight assembly because only one substrate is used, which may be lightweight polycarbonate instead of glass. No cover lamination is needed, as compared with the gelatin HUD or visor display;

d. it is easier to fabricate a multiple-color HUD combiner or visor display combiner;

e. the combiner eliminates image-degrading flare and chromatic dispersion caused by slanted fringes in holographic gelatin combiners, which allows the use of broader-band display sources (CRTs) resulting in brighter, more efficient displays;

f. the graded-index combiner with an oxide coating is environmentally stable and may, therefore, be applied on plastic, as well as on glass substrates;

g the fabrication of the combiner is more cost-effective on a production level than gelatin combiners. Tooling costs may also be lower;

h. the reduced combiner thickness results in less see-through distortion even when both surfaces are asperic;

i. with only one wedge tolerance to consider instead of several, there is less difficulty in eliminating fabrication related see-through distortion, boresight error and, in the case of helmet visor displays, binocular disparity;

j. for head-up displays, the lower cantilevered mass of the lightweight combiner makes the combiner stiffer and less vibration sensitive;

k. the plastic substrate of the combiner provides a quality of being birdstrike-safe, thereby providing the capability of designing a head-up display with enhanced look-up capability;

l. the combiner when used in a helmet visor display is lighter weight than gelatin hologram visors, and has reduced see-through distortion and ghost images, with an overall improved optical MTF and image resolution.

Although the invention has been described with reference to specific embodiments, the exact nature and scope of the invention is defined in the following claims.

What is claimed is:

1. An optical structure comprising:
    (a) a substrate formed of a plastic material and having at least one aspheric surface, the asphericity of said substrate surface being designed to compensate optical aberrations; and
    (b) a layer formed on said surface, said layer comprising a graded-index diffraction-type reflective coating of photochemical-vapor-deposited material for reflecting radiation within one or more predetermined narrow band ranges of wavelengths impinging on said coating wherein said coating comprises a selected plurality of materials deposited on said substrate to a thickness having a predetermined profile wherein the stoichiometric composition of said coating as deposited varies in a first predetermined periodic and continuous pattern as a function of thickness and in a second predetermined pattern laterally across said substrate to produce successive gradations in said index of refraction in said first and second predetermined patterns as a function of said thickness and as a function of the lateral position on said substrate.

2. The structure of claim 1 wherein said graded-index coating comprises a plurality of materials deposited on said substrate to a predetermined thickness wherein said coating as deposited has a stoichiometric composition which varies in a predetermined pattern as a function of said thickness to produce successive gradations in the index of refraction in said coating in said predetermined pattern.

3. The structure of claim 1 wherein said plastic material is polycarbonate.

4. The structure of claim 1 wherein said layer comprises a diffraction optical element, said thickness varies across the surface of said substrate in said predetermined profile, and peak reflection wavelength of said optical element varies across said horizontal surface of said substrate as a function of said thickness and said second predetermined pattern.

5. A high efficiency optical combiner comprising:
    a substrate formed of a plastic material and having at least one aspheric surface and a second surface;
    a graded-index coating applied to one surface of said substrate by photochemical vapor deposited material for providing a selectively reflective optical function; and
    a broad band antireflective coating applied to the other surface of said substrate to minimize reflection of incident radiation in the visible wavelength range,
    said graded-index coating and said antireflective coating sandwiching said substrate.

6. The optical combiner of claim 6 wherein said graded-index layer is of uniform thickness.

7. The optical combiner of claim 5 wherein said selectively reflective function comprises the reflectance of radiation within one or more predetermined narrow band ranges of wavelengths impinging on said coating.

8. The optical combiner of claim 5 wherein said graded-index coating comprises a layer of chosen materials deposited on said substrate to a predetermined thickness wherein said layer as deposited has a stoichiometric composition which varies as a function of said thickness to produce successive gradations in the index of refraction in said layer in said predetermined periodic pattern.

9. The optical combiner of claim 8 wherein said predetermined periodic pattern is a non-sinusoidal pattern.

10. The optical combiner of claim 9 wherein the magnitude of the modulation in the index is increased to broaden the bandwidth of the peak reflectivity of the coating.

11. The optical combiner of claim 9 wherein the average index is greater than about 1.54.

12. The optical combiner of claim 8 wherein said predetermined periodic pattern comprises a linear superpositioning of a plurality of sinusoidal patterns selected to produce multiple peaks in the spectral reflectivity response of said combiner.

13. The optical combiner of claim 5 wherein said layer comprises a selected plurality of materials deposited on said substrate to a thickness having a predetermined profile wherein the stoichiometric composition of said layer as deposited varies in a first predetermined periodic and continuous pattern as a function of thickness and in a second predetermined pattern laterally across said substrate to produce successive gradations in said index of refraction in said first and second predetermined patterns as a function of said thickness and as a function of the lateral position on said substrate.

14. In a display apparatus for combining images, an improved optical combiner comprising:
    a substrate formed of a plastic material and having at least a first surface defining an aspheric contour and a second surface; and
    a layer formed on one of said surfaces, said layer comprising a graded-index, diffraction-type reflective coating of photochemical-vapor-deposited material for reflecting radiation within one or more predetermined narrow band ranges of wavelengths impinging on said layer, wherein said layer comprises a selected plurality of materials deposited on said substrate to a thickness having a predetermined profile wherein the stoichiometric composition of said layer as deposited varies in a first predetermined pattern as a function of thickness and in a second predetermined pattern laterally across said substrate to produce successive gradations in said index of refraction in said first and second predetermined patterns as a function of said thickness and as a function of the lateral position on said substrate.

15. The apparatus of claim 14 wherein the asphericity of said first surface is adapted to compensate aberrations in said display apparatus.

16. The apparatus of claim 14 wherein said graded-index layer comprises a plurality of materials deposited on said substrate to a predetermined thickness wherein said layer as deposited has a stoichiometric composition which varies in a predetermined periodic and continuous pattern as a function of said thickness to produce successive gradations in the index of refraction in said layer in said predetermined pattern.

17. The apparatus of claim 16 wherein the asphericity of said first surface is adapted to compensate aberrations in said display system, said predetermined pattern being generally parallel to the surface of said coating.

18. The apparatus of claim 14 wherein the surface of the coating remote from said substrate is exposed to the atmosphere.

19. The apparatus of claim 14 wherein said coating comprises a graded-index coating applied to one of said substrate surfaces and further comprising a broad band antireflective coating applied to the other of said substrate surfaces.

20. Biocular display apparatus for mounting on a helmet to provide biocular images combined with external images received through a helmet visor comprising:
an object source mounted adjacent the helmet for providing object image display light;
beam splitting means for splitting incident light from the object source into separately directed beams;
a generally transparent visor for mounting on said helmet having dual optical combiner elements oriented at a selected angle, said combiner elements comprising a substrate formed of a plastic material and having an aspheric surface and a graded-index, diffraction-type reflecting coating formed thereon by photochemical vapor deposition for reflecting radiation within one or more predetermined narrow band ranges of wavelengths, said combiner elements being substantially transparent to permit the helmet wearer to view external scenes therethrough but having the capability of reflecting light directed thereto from the object source to project biocular images at respective exit pupils in the general vicinity of the helmet wearer's eyes;
means between the object source and the splitting means for directing light from the object source to the splitting means; and
fold means between the splitting means and the combiner elements for directing the beams from the splitting means toward the respective combiner elements, wherein said coating comprises a selected plurality of materials deposited on said substrate to a thickness having a predetermined profile wherein the stoichiometric composition of said layer as deposited varies in a first predetermined pattern as a function of thickness and in a second predetermined pattern laterally across said substrate to produce successive gradations in said index of refraction in said first and second predetermined patterns as a function of said thickness and as a function of the lateral position on said substrate.

21. The display apparatus of claim 20 wherein said graded-index coating comprises a plurality of materials deposited on said substrate to a predetermined thickness profile wherein said layer as deposited has a stoichiometric composition which varies in a predetermined pattern as a function of said thickness to produce successive gradations in the index of refraction in said layer in said predetermined pattern.

22. The display apparatus of claim 20 wherein the asphericity of said combiner surface compensates optical aberrations in said display apparatus.

23. The display apparatus of claim 20 wherein the directing means is a relay lens comprising a modified Cooke triplet including aspheric lens surfaces and a further lens element including aspheric surfaces.

24. The display apparatus of claim 23 wherein the relay lens is off-axis.

25. The display apparatus of claim 20 wherein the object source is tilted with respect to the directing means.

26. The display apparatus of claim 20 wherein the directing means comprises a folding prism having an entrance face orthogonal to an optical axis of the apparatus and an exit face at a wedge angle to said axis.

27. The display apparatus of claim 20 wherein the beam splitting means has concave exit surfaces.

28. In a head-up display comprising an image source, and an optical combiner interposed between a user and the external scenery for selectively reflecting light from the image source to the user, an improved optical combiner comprising:
a substrate formed of a plastic material and having at least one aspheric surface; and
a layer formed on said substrate, said layer comprising a graded-index, diffraction-type reflective coating of photochemical-vapor-deposited material for reflecting radiation within one or more predetermined narrow band ranges of wavelength impinging on said layer wherein said layer comprises a selected plurality of materials deposited on said substrate to a thickness having a predetermined profile wherein the stoichiometric composition of said layer as deposited varies in a first predetermined pattern as a function of thickness and in a second predetermined pattern laterally across said substrate to produce successive gradations in said index of refraction in said first and second predetermined patterns as a function of said thickness and as a function of the lateral position on said substrate.

29. The apparatus of claim 28 wherein said graded-index coating comprises a plurality of materials deposited on said substrate to a predetermined thickness profile wherein said layer as deposited has a stoichiometric composition which varies in a predetermined pattern as a function of said thickness to produce successive gradations in the index of refraction in said layer in said predetermined pattern.

30. The apparatus of claim 28 wherein the asphericity of said combiner surface compensates optical aberrations in said display apparatus.

31. In a head visor display comprising an image source and an optical combiner interposed between a user and the external scenery as a visor for selectively reflecting light from the image source to the user, an improved optical combiner comprising:
a substrate formed of a plastic material and having at least one aspheric surface, the asphericity of said substrate surface being designed to compensate optical aberrations; and
a layer formed on said surface, said layer comprising a graded-index diffraction-type reflective coating of photochemical-vapor-deposited material for reflecting radiation within one or more predetermined narrow band ranges of wavelengths impinging on said coating wherein said coating comprises a selected plurality of materials deposited on said substrate to a thickness having a predetermined profile wherein the stoichiometric composition of said coating as deposited varies in a first predetermined pattern as a function of thickness and in a second predetermined pattern laterally across said substrate to produce successive gradations in said index of refraction in said first and second predetermined patterns as a function of said thickness and a function of the lateral position on said substrate.

32. The invention of claim 31 wherein said graded-index coating comprises a plurality of materials deposited on said substrate to a predetermined thickness profile wherein said coating as deposited has a stoichiometric composition which varies in a predetermined pattern as a function of said thickness to produce successive gradations in the index of refraction in said coating in said predetermined pattern.

* * * * *